US012797839B1

(12) United States Patent
Anderson et al.

(10) Patent No.: US 12,797,839 B1
(45) Date of Patent: Nov. 17, 2026

(54) CATALYTICALLY ACTIVE ACTIVATED BIOCHAR COMPOSITIONS AND SYSTEMS AND METHODS FOR MAKING CATALYTICALLY ACTIVE ACTIVATED BIOCHAR COMPOSITIONS

(71) Applicants: Renel A. Anderson, Everson, WA (US); Akila G. Karunanayake, Everson, WA (US)

(72) Inventors: Renel A. Anderson, Everson, WA (US); Akila G. Karunanayake, Everson, WA (US)

( * ) Notice: Subject to any disclaimer, the term of this patent is extended or adjusted under 35 U.S.C. 154(b) by 567 days.

(21) Appl. No.: 18/331,854

(22) Filed: Jun. 8, 2023

Related U.S. Application Data

(63) Continuation of application No. 17/651,223, filed on Feb. 15, 2022, now abandoned, which is a continuation of application No. 16/292,125, filed on Mar. 4, 2019, now abandoned.

(60) Provisional application No. 62/637,904, filed on Mar. 2, 2018.

(51) Int. Cl.
*B01J 37/08* (2006.01)
*B01J 21/18* (2006.01)
*C02F 1/28* (2023.01)
*C02F 1/70* (2023.01)
*C09K 17/02* (2006.01)
*C02F 101/16* (2006.01)

(52) U.S. Cl.
CPC ............ *B01J 37/084* (2013.01); *B01J 21/18* (2013.01); *C02F 1/283* (2013.01); *C02F 1/70* (2013.01); *C09K 17/02* (2013.01); *C02F 2101/16* (2013.01)

(58) Field of Classification Search
None
See application file for complete search history.

(56) References Cited

U.S. PATENT DOCUMENTS

2015/0128672 A1* 5/2015 Shearer .................... C05G 3/00 71/24

OTHER PUBLICATIONS

Boyette et al.; The Effect of Biomass Physical Properties on Top-Lit Updraft Gasification of Woodchips; Energies, 9, 283; 2016.*
Yu et al.; Development of Biochar-Based Functional Materials: Toward a Sustainable Platform Carbon Material; Chem. Rev., 115, 12251-12285; 2015.*

* cited by examiner

*Primary Examiner* — Guinever S Gregorio
(74) *Attorney, Agent, or Firm* — Schacht Law Office, Inc.; Michael R. Schacht; Bronte Brillantes

(57) ABSTRACT

A method of producing remediation media comprises the steps of providing biomass chips of a predetermined size and moisture content, storing a nitrogen compound, introducing the biomass chips, air, and heat into an updraft gasifier system, injecting the nitrogen compound into the updraft gasifier system, and operating the updraft gasifier for a predetermined time and at a predetermined temperature. The biomass chips are suspended and mix with the injected nitrogen to obtain raw remediation media.

8 Claims, 11 Drawing Sheets

CATALYTICALLY ACTIVE ACTIVATED BIOCHAR COMPOSITIONS AND SYSTEMS AND METHODS FOR MAKING CATALYTICALLY ACTIVE ACTIVATED BIOCHAR COMPOSITIONS

RELATED APPLICATIONS

This application, U.S. patent application Ser. No. 18/331,854, a continuation of U.S. patent application Ser. No. 17/651,223 filed Feb. 15, 2022, now abandoned.

U.S. patent application Ser. No. 17/651,223 is a continuation of U.S. patent application Ser. No. 16/292,125 filed Mar. 4, 2012, now abandoned.

U.S. patent application Ser. No. 16/292,125 claims benefit of U.S. Provisional Application Ser. No. 62/637,904 filed Mar. 2, 2018, the contents of which are incorporated herein by reference.

TECHNICAL FIELD

The present invention relates to catalytically active activated biochar compositions and, in particular, to catalytically active activated biochar compositions for remediating water pollution and systems and methods for making such catalytically active activated biochar compositions.

BACKGROUND

The release of harmful contaminants, such as heavy metals, organic pollutants, hydrocarbons, grease and oils, and agricultural nutrients, into water bodies impacts and impairs the aqueous eco-system. Commonly utilized fertilizing products, herbicides, pesticides, and fungicides used in agriculture and industrial chemicals may leak, leach, be dumped or transported onto soils by wind, water, and gravity, resulting in impacted soils. Impacted soil ecosystems may be responsible for adequate exchange of nutrients to promote plant or crop growth. Fisheries may also be impacted by dissolved metals and/or algal blooms that deplete oxygen and release cytotoxins in spawning streams. Water contaminants include metals, both cationic and anionic forms, oils, organic pollutants, PFOAS, PFOS, pesticides, herbicides, pharmaceuticals, nutrients such as phosphates and nitrates, toxic bacteria such as coliform and *Enterococcus* bacteria, chemical and biologic oxygen demand, chlorine, and sedimental runoff including solids, both total and dissolved. A water source can thus become contaminated or "polluted" when exposed to one or more solid and/or liquid or gaseous contaminate materials.

Water treatment devices, systems, and methods have been used for centuries to filter water, wine, and other liquids to remove harmful and/or foul smelling contaminates. Today it is estimated that no less than 60% of water sources including those utilized for drinking water are impaired and require treatment. Infrastructure, such as treatment vaults, bioretention facilities, and water treatment facilities, at municipal and industrial sites is expensive. Further, even when drinking water sources are affected by pollutants, treatment often relies on the least expensive treatment materials, devices, systems, and methods, which may implement inadequate methodologies for dealing with the potential problems. Further, hundreds of contaminants now on the EPAs list of contaminants that are potentially destructive to the ecosystem and/or human health are currently unregulated.

Contaminated water may be environmentally harmful and unsuited for human use. Water provided for human use is typically stored and conveyed in a water supply system, and it may be feasible to remove contaminates at one or more points in the water supply system.

Natural bodies of water (e.g., groundwater, lakes, ponds, rivers, streams, oceans) can also become contaminated. A contaminated natural water body can be harmful to the ecosystem including that body of water. Treating contaminated water in a natural body of water may be impractical or impossible given the volume and/or inaccessibility of many forms of natural water bodies.

Accordingly, contamination of natural bodies of water is preferably avoided rather than treated after contamination. Contamination of natural water bodies is avoided by preventing contamination of any sources of water feeding the natural water body and/or by treating water from any contaminated source feeding the natural body of water where prevention is not possible. To prevent contamination of a natural body of water, contamination of water should be prevented and, if that fails, contaminated water should be treated as close to the source of contamination as possible.

Biochar ("biomass charcoal") is created by the thermal decomposition of a biomass, such as wood, in the absence of oxygen (e.g., pyrolysis). Biochar is a stable, high carbon solid with various conventional uses, such as a soil amendment and a carbon sink. Biochar may be treated, (e.g., pretreated and/or post-treated) with one or more metals to enhance adsorptive properties of the biochar.

The present invention relates to biochar compositions and to systems and methods for making biochar compositions. The present invention is of particular significance as applied to biochar compositions, and systems and methods of making biochar compositions, adapted to remove contaminates from water, and that application of the principles of the present invention will be described herein detail. And as will be described in further detail below, the biochar compositions of the present invention may also be used as a soil amendment to promote plant growth.

Thermal-chemical conversion of carbon rich products have been used for centuries. Coal, anthracite, and lignite, and even peat the youngest of the group of mined fuels, are very old, "fossilized" products that have been converted to carbon products usually by a low to no oxygen environment (therefore does not allow for combustion), that is designed be used for heat, cooking, and energy to fuel industries such as steel manufacturing and fueling steam engine trains. They are considered for the most part "fuel" and thus the primary goal has been to incorporate as much energy potential as possible as they products are burned. These coal-based resources come at high cost environmentally, both in acquisition of the feedstock, and in the use of it. Coal-based resources are not infinite, nor are coal-based resources sustainable products. Coal-based resources are further associated with the costs of importation and, because coal-based resources are heavy, are costly to transport.

Activated Carbons have long been employed because of their large surface areas occurring as multitudes of micropores. These micropores are excellent if not particularly fast in remediating waters, and they do not have much influence on environmentally impacted soils except at the interface with water.

The terms "biochar" and "biocarbon" are defined as the solid stable carbon particles that are the residues of a pyrolysis system utilizing only biomass materials that once supported life. Carbon is the primary component of biochar and biocarbon.

Biomasses used to form biochar materials range from wood to manures and can be made utilizing a variety of equipment and systems. Biochar materials differ from coal in that the biomass forming the feedstock has a relatively high moisture content and that that the feedstock is generally fresh (e.g., stored for a finite period before undergoing thermochemical conversion to biochar). Depending on feedstock, more ash is generated when making biochar material than in the pyrolysis of coal-based materials, and the biochar material has pores of different, typically larger, size than those of activated carbon. Some biochars have the adsorption capacity to be useful for remediation of particular contaminants. However, the heavy concentration of ash minerals and insufficient porosity to prevent fouling render many biochar materials inadequate for us in remediation installations. Moreover, biochar materials can have the distinct disadvantage of being tainted with tars during production. Biochar materials tainted tar require larger treatment areas due to their relatively low and slow uptake rate of contaminants.

Pyrolyis and gasification are two different industrial processes for implementing gasification chamber pyrolysis. Pyrolysis is a thermal decomposition process that occurs in the absence of air (e.g., substantially or totally anaerobic), often in the presence of steam, that rearranges the molecular structure of the solid feedstock. Pyrolysis can be used in the decomposition of biomass into a range of useful products, but does so without an oxiding agent that would permit gasification to any appreciable extent. With gasification, the use of a medium is necessary to break the feedstock into primarily gaseous products and charred particles of carbon. Gasification and combustion are closely related thermochemical processes but have the important difference that gasification packs energy into a chemical bond in product gases, while combustion breaks a chemical bond to release energy. Gasification may add hydrogen to the gas stream and strip the carbon away from the feedstock to produce gases with high hydrogen to carbon ratios. Combustion, by contrast, oxides the hydrogen and carbon into water and carbon dioxide and the solid. Pyrolysis is typically accomplished at 300-650 degrees C. and involves larger process time than gasification. In contrast, gasification is often accomplished at much higher temperatures and yields its solid carbon product in short time but lessens yields of the carbon end-product. Typically, gasification is optimized for the conversion of solid feedstock in useful gaseous fuel or chemical feedstock that can be burned to release energy used for productive value.

The need exists for improved biochar compositions and systems and methods for making biochar compositions, improved water treatment compositions, systems, and methods, and/or improved soil amendment materials.

SUMMARY

The present invention may be embodied as a method of producing remediation media comprises the steps of providing biomass chips of a predetermined size and moisture content, storing a nitrogen compound, introducing the biomass chips, air, and heat into an updraft gasifier system, injecting the nitrogen compound into the updraft gasifier system, and operating the updraft gasifier for a predetermined time and at a predetermined temperature. The biomass chips are suspended and mix with the injected nitrogen to obtain raw remediation media.

The present invention may also be embodied as a remediation media produced by the following process. Biomass chips of a predetermined size and moisture content are provided. A nitrogen compound is stored. The biomass chips, air, and heat are introduced into an updraft gasifier system. The nitrogen compound is injected into the updraft gasifier system. The updraft gasifier is operated for a predetermined time and at a predetermined temperature such that the biomass chips are suspended and mix with the injected nitrogen to obtain raw remediation media.

The present invention may also be embodied as a system for processing biomass to obtain remediation media comprising a supply of biomass, a supply of liquid nitrogen, a source of air, fuel, and an updraft gasifier system. The updraft gasifier system comprises a firebox, a processing chamber, a biomass inlet port, a biomass outlet, and a grate arranged between the firebox and the processing chamber. The fuel is converted to heat in the firebox while air is directed into the firebox such that heat passes through the grate into the processing chamber. The biomass is fed into the processing chamber above the grate through the biomass inlet such that the heat from the firebox causes the biomass to be heated and to move up within the processing chamber. The liquid nitrogen is fed into the processing chamber to mix with the biomass as the heated biomass moves up within the processing chamber. The biomass exits the processing chamber through the biomass outlet as the remediation media.

DETAILED DESCRIPTION

The present invention relates to catalytically activate activated biochar (CAAB) CAAB compositions and to systems and methods for making CAAB compositions. CAAB is an activated biochar that is processed to include or form porous, active carbon particles as well as to inherently incorporate a catalyst capable of accelerating desired chemical reactions. The present invention is of particular significance when applied to CAAB compositions, and systems and methods of making CAAB compositions, that re adapted to remove contaminates from water, soil, fluids, solids, and gasses and that application of the principles of the present invention will be described herein detail. In the following discussion, numerical ranges are inclusive.

I. EXAMPLE METHODS FOR FABRICATING CAAB COMPOSITIONS

Figure 1A:
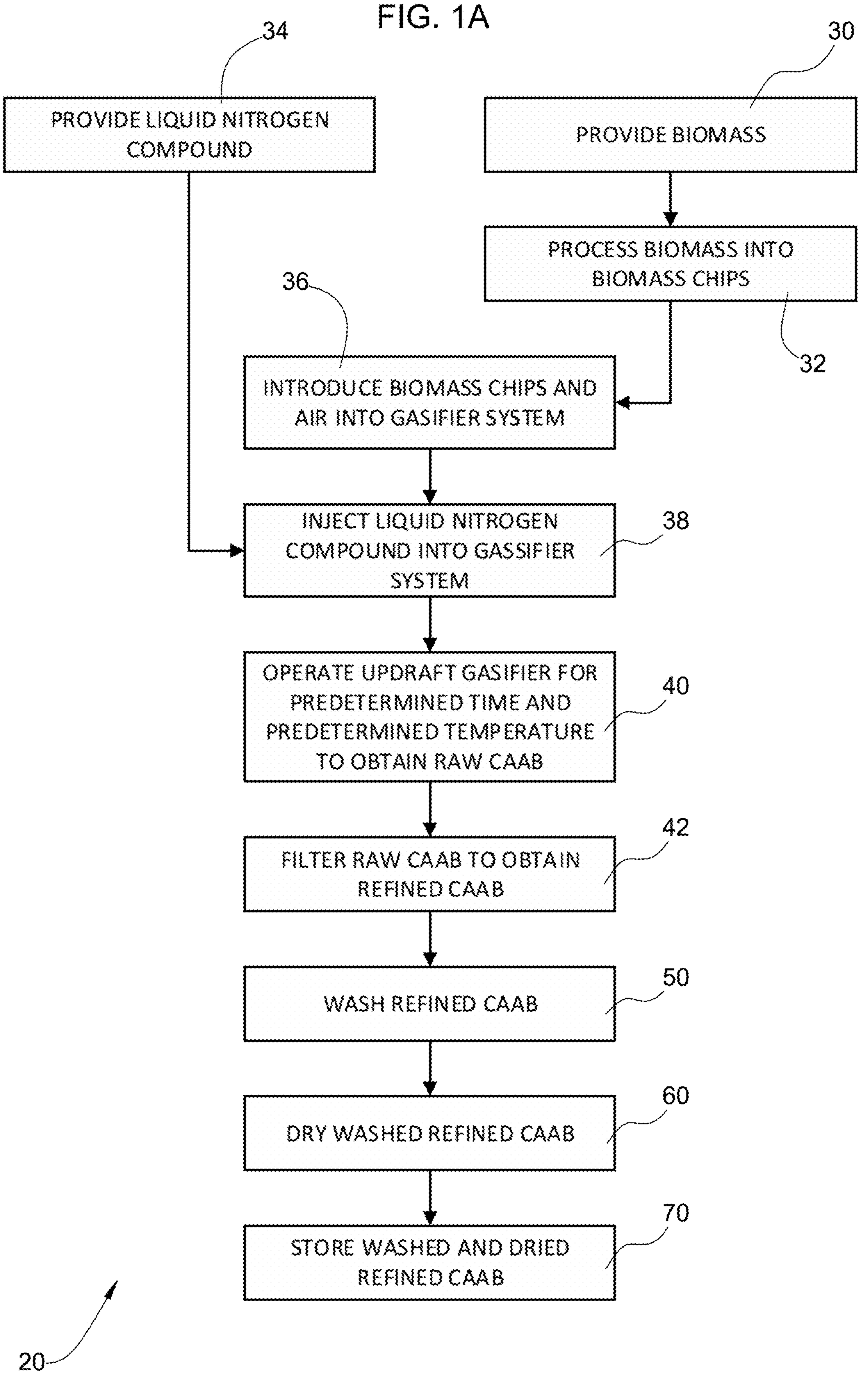
FIG. 1A is a process flow diagram depicting an example method of producing CAAB compositions of the present invention.

Turning now to FIG. 1A of the drawing, depicted therein is an example CAAB process 20 for fabricating CAAB compositions in accordance with the principles of the present invention. The example CAAB process 20 comprises the steps of providing biomass (step 30), processing the biomass into biomass chips (step 32), and providing liquid nitrogen at step 34. At step 36, the biomass chips and air are introduced into an updraft gasifier system (described below). At step 38, the liquid nitrogen compound is introduced into the updraft gasifier system. At step 40, the updraft gasifier system is operated for a predetermined time and for a predetermined temperature to obtain a raw CAAB composition.

After step 40, the raw CAAB contains both refined CAAB and CAAB dust. At an optional step 42, the raw CAAB is filtered to remove the CAAB dust, yielding only refined CAAB. At an optional step 50, the refined CAAB is washed, and the washed refined CAAB is dried at an optional step 60. The washed and dried refined CAAB may next be stored at an optional step 70.

The biomass material may use as the biomass feedstock undried, untreated, fresh waste wood. In the examples described below, the example biomass feedstock is fresh, thus naturally moist, untreated softwood such as Douglas-Fir (i.e., *Pseudotsuga menziesii*).

More generally, the biomass feedstock is soft wood, having a low specific density as other conifers, when compared to the heavier hardwoods. All wood types undergo some degree of shrinkage in the heating reaction. Douglas fir is in the moderate range in under typical processing conditions, but as described later is exposed to exceptional heat and is able to retain a solid structure even after very hot, very fast processing. The cellular structure of Douglas fir is harder than most softwoods. Specific heat is an important thermodynamic property that is an indication of the heat capacity of a substance. Moisture and temperature affect the specific heat of biomass but the density or wood species do not have much in way of influence over the specific heat. Comparison of the Ultimate Analysis on dry basis of Douglas fir, shows it to be C. 52.3%, H 6.3% N, 9.1% S, 0%, O 40.5% and Ash at 0.8% with Heating value of 21,051. Maple, a hardwood differs little in the Ultimate Analysis, though contains far less Nitrogen, slightly more ash as a percentage, and a relatively lower heating value. Coal by contrast starts with a C % of 65.8, with H at 4.88%, N at 1.0%, oxygen at 16.2% and Ash at 11.2% and with higher heat energy value of 26,436.

The example gasification process utilized for production of CAAB employs feedstock having a length of a maximum of 3 inches, and the chips are obtained from the biomass feedstock by, for example, feeding the feedstock through a wood chipper to reduce the size of the biomass into chips of a generally rectangular solid shape having a length, a width, and a thickness. Larger feedstock materials may require longer processing times and may fall back to the grate within the updraft gasifier rather than remaining airborne. To make CAAB as recited herein, the feedstock material should be sized and dimensioned to remain suspended during the processing time and then be drawn up and away from the grate of the updraft gasifier system.

The example biomass chips used in the example CAAB process 20 have the characteristics as defined in the following Table A. Biomass chips suitable for use by the example CAAB process 20 are processed to have a generally rectangular shape defining a length, width, and thickness as defined in the following Table I-A. In the following Table I-1, the moisture content is specified as percent by weight.

TABLE I-A

| Characteristic | Example | First Range | Second Range |
|---|---|---|---|
| Chip Length | ~2" | 1" to 3" | 0.5" to 5" |
| Chip Width | ~5/8" | 1/4" to 1/2" | 1/8" to 1" |
| Chip Thickness | ~3/8" | 1/4" to 1/2" | 1/8" to 3/4" |
| Moisture Content | ~45% | 40% to 60% | 30% to 70% |
| Chip Average Volume | 0.422 $in^3$ | 0.125" $in^3$ to 1.0 $in^3$ | 0.016" $in^3$ to 6.0 $in^3$ |
| Specific Density | ~0.4 | 0.2 to 0.5 | 0.05 to 0.7 |
| Bulk Density | ~0.2 | 0.1 to 0.3 | 0.05-0.4 |
| Chip Average Weight | ~4 g | 3 to 5 g | 0.01 to 10 g |

The average chip size and/or surface area per weight allows the biomass chips to be propelled into the updraft gasifier system above a hearth or grate thereof and retained in the turbulence and convection of the high heat of the firebox. The biomass chips are directionally propelled into regions within the updraft gasifier system processing chamber containing a low concentration of biomass chips in process such that coverage of the is evenly distributed above the grate area, in a turbulent mixing zone. Ideally, the suspended biomass chips never coming in contact with the grate during processing. The feedstock is thus shaped such that the updraft within the reactor is capable of pushes the feedstock particles being processed such that the feedstock particles are carbonized through the steam and gases in the reactor as they drift or propel upwards with the convective gas forces. Further, wood, unlike other solids, biomass is highly anisotropic. The thermal conductivity along fibers of biomass is different from that which is achieved going across the grain of the wood forming the biomass. Atypical wood may have channels carrying gas and moisture. The effect of is that thermal conductivity runs parallel to the direction of the wood fiber during processing.

The acceptable ranges of moisture content of the biomass chips allow the use of a wide range of biomass materials without the need to pre-dry the biomass chips before the chips are processed. Using the example CAAB process 20. Alternate methods of pyrolysis or gasification often require a pre-drying step that is avoided by the systems and methods of the present invention, which reduces the costs required by additional energy inputs and time, because the chips are allowed to dry under normal storage conditions.

The example CAAB process 20 thus eliminates the need to expend, outside the reactor (e.g., updraft gasifier), energy and/or time to dry, instead allowing natural drying of the biomass chips used as feedstock. Because of the high allowable moisture content, the example CAAB process 20 reduces atmospheric carbon pollution when compared to a system that requires pre-drying of the biomass feedstock. Although the instantaneous vaporization takes place within the reactor or updraft gasifier, this vaporization does require additional fuel energy, in this case the heat provided by virgin wood waste to produce the necessary energy to vaporize moisture on and within the biochar chips. Some compensation for this is offset by the recycling of hot gas from the systems which is reinjected into the firebox.

Air is the medium in which the feedstock is gasified. Air is injected to retain the voracity of the fire and the temperature of the gases, which need to be maintained not lower than 900 degrees C., or hot enough to reform the feedstock (e.g., vaporize the phylum, phloem, sugars, cellulose, and hemicellulose structures) while reforming the lignin-based cell walls to a carbon solid, amorphic structure or graphene sheets somewhat resembling the feedstock cellular arrangement prior to thermochemical treatment within the gasifier. The breakdown of the feedstock into the constituent elements N, O, C, H creates potential Nitrous Oxide formation in the gasification gases. These products are optimized by the use of injection of a Nitrogen containing solution that can become gaseous and react to, limit, reduce, and/or remove the potential for Nitroxide production. But importantly, a substance that will rapidly convert to gas under high heat can be used as a product to enhance "active biochar" (steam from the moisture carried into the reactor by the feedstock) in to "catalytically active" biochar. Catalytically active biochar reacts is very useful as a remediation media because it reacts quickly with contaminants in water or soil as will be described in further detail below.

The example liquid nitrogen compound is a nitrogen containing compound. One example of a liquid nitrogen compound is urea. In particular, the systems and methods of the present invention treat softwood at high temperature with organic nitrogen-containing compound to produce catalytically active activated biochar. In particular, the process of treating the feedstock within the processing chamber with the liquid nitrogen compound comprises the following steps. Wet feedstock is mixed with organic nitrogen-containing compound (next to first nitrogen atom, at least two or more heteroatoms contain lone pairs). The mixture is heated at high temperature. The mixture is activated, with steam produced while heating the wet feedstock.

Activate biochar used in this invention refer a material characterized larger surface area and considerable porosity. The term "Catalytically Active" refers to a material having hydrogen peroxide decomposition parameter $t_{1/4}$ of 60 min or less using hydrogen peroxide conversion test as described in the example. The term "Catalytically Inactive", on the other hand, refers to having $t_{1/4}$ of more than 60 min using the same test. In the systems and methods of the present invention, the example wet feedstock chips are specified to be 3-inch length, with a narrower width to achieve a generally rectangular shape. The depth of the example wet feedstock chips typically will not exceed ½ inch and is greater than ¼ inch. The example wet feedstock chips should be 30-70% wet. Instead of adding water to get to the desired moisture content or level, green wood waste is employed. As generally described above, the wood is soft wood, have low specific density, which allows the feedstock be shot into the firebox and directionally entered to be oriented over the hearth or grate in a region containing a lesser amount of the biomass already in process than in a region above the region adjacent to the hearth or grate.

The mixture obtained after mixing the wet feedstock with nitrogen containing compound at high temperature is catalytically active. The nitrogen containing compound can be amines, amides, nitriles, nitrosamines, cyanides, isocyanides, and oximes. A preferred nitrogen containing compound is urea. Another advantage of adding urea is removal of toxic NOx by converting it to diatomic nitrogen ($N_2$), and water ($H_2O$). This result more greener and environment friendly process.

$$4NO + 2(NH_2)2CO + O_2 \rightarrow 4N_2 + 4H_2O + 2CO_2$$

The amount of urea can be 0.1-10 wt. % depending on the weight of wet feedstock. The mixture of biochar and urea is activated at a temperature range 800-1300° C. During this process, wet feedstock is partially gasified with the stem produced by exposure of the wet feedstock to heat. The systems and methods of the present invention result in a material contain higher pore volume and higher surface area.

In the example systems and methods described herein, wet feedstock is used and the feedstock is not dried after exposure to the nitrogen containing group of the liquid nitrogen compound. The system used to activate biochar is produced when wet feedstock is exposed to high temperature by applying the nitrogen containing compound and heat supply simultaneously to wet feedstock inside the chamber Advantageously, the catalytically active activated biochar of the invention has high surface area. Preferably internal surface area is in the range of 550-1200 $m^2/g$. This invention give rise to uptake rate about 0-30 mins for removal of contaminants from water, which is orders of magnitude greater in (1) uptake rate and, (2) greater in adsorption capacity, than other typically-manufactured biochars used in remediation.

Figure 1B:
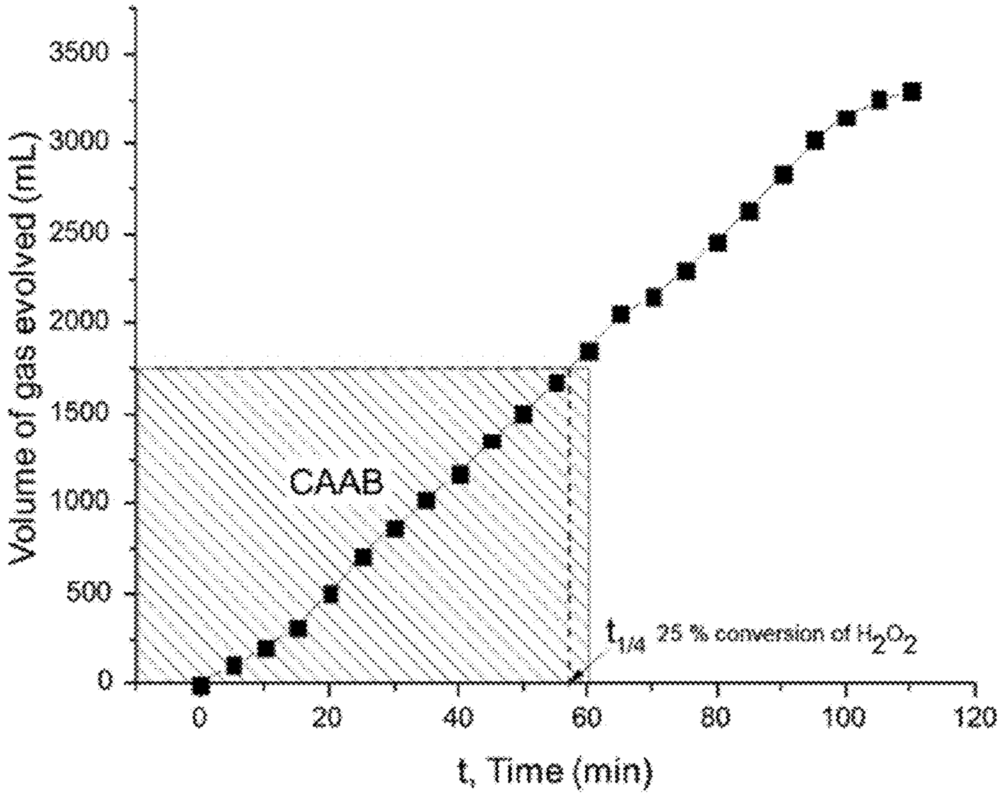
FIG. 1B is a graph illustrating properties of the CAAB compositions of the present invention.

The total gas volume evolved during the hydrogen peroxide decomposition test have been presented in FIG. 1B for the sample. Dash line indicates at which volume the $t_{1/4}$. Time required to convert 25% of the hydrogen peroxide into oxygen gas in an aqueous solution refer to as the $t_{1/4}$. The catalytic activity parameter $t_{1/4}$ for CAAB was found to be 57 min. The hydrogen peroxide decomposition test measures catalytically active activated biochar based on the decomposition rate of hydrogen peroxide under controlled conditions. In particular, a fixed amount of powdered material (e.g., 150 mg) is dispersed in a mixture of 100 mL demineralized water and 50 mL aqueous potassium phosphate buffer solution (68 g/L $KH_2PO_4$ and 87 g/L $K_2HPO_4$) and contained in a thermostatically controlled and magnetically stirred vessel at 60° C. At time t=0 minutes, 50 mL of a solution containing 35 wt. % of hydrogen peroxide is added to the vessel, and the amount of gas evolved is measured as function of time. The t¼ is defined as the time in minutes until a total gas volume of 1.75 L has been generated.

The following Table I-B contains examples of the amount of nitrogen containing compound used by percentage weight of the biomass feedstock in percent in row 1 and by the hydrogen peroxide decomposition test as generally described above in row 2.

TABLE I-B

| Characteristic | Example | First Range | Second Range |
|---|---|---|---|
| % Nitrogen Containing Compound | ~1 | 0.1-2 | 0.01-10 |
| Hydrogen Peroxide Decomposition Test (t1/4) min | ~57 | 30-50 | 1-≤60 |

The liquid nitrogen compound and air are at temperature when the biomass chips are introduced into a gasifier system at step 34. At introduction, the moisture of the chips becomes superheated and turns to steam and gaseous compounds that mix in the turbulence with the biochar chips. Air can be added as needed, and into the mix urea is also monitored and added as needed. The mixing zone (above the injection zone where the biomass is injected) is turbulent and, the particles of feedstock, which are at this point reduced in size and moisture, enter the upward trajectory of the gases lifting beyond the highest heat temperature (HTT) zone to the separation zone. The gasifier system is operated at step 40 and at a predetermined temperature to obtain a raw CAAB composition. Typically, the quantity of the liquid nitrogen compound mixed with the biomass chips is based on the quantity of biomass chips. As one example, the liquid nitrogen compound and air, may be introduced into the gasifier system at any amount that does not increase internal pressure of the firebox. The N-catalyst is introduced at an amount of approximately 1% by weight of the biomass chips. The catalytic compound should, in any event, be introduced into the gasifier system at an amount of within a first range of 0.1 to 2% by weight of the biomass chips or in a second range of 0.01 to 5% by weight of the biomass chips.

An example gasifier that may be utilized for the production of CAAB is an updraft, transport gasifier system that has the characteristics of fixed-bed, entrained-flow, and fluidized-bed reactors. The example gasifier used to produce CAAB as described herein operates at circulation rates, velocities, and heat considerably higher than those of conventional circulating fluidized bed (CFB) gasifier. This results in higher throughput, better mixing, and higher mass and heat-transfer rates. The fuel particles need to be relatively fine and are side fed into the reactor. The processing time and temperature depends on the nature of the biomass chips (e.g., size, shape, and moisture content). The following table I-C lists examples of time and highest heat temperature (HHT) used to process the example biomass chips described above into a CAAB composition of the present invention.

TABLE I-C

| Parameter | Example | First Range | Second Range |
|---|---|---|---|
| Example 1 | | | |
| HHT | ~1075 °C | 910 to 1250 °C | 911900 °C to 1450 °C |
| Time | 10 seconds | 11 to 20 seconds | 1 to 30 seconds |
| Example 2 | | | |
| HHT | ~1075 °C | 900 °C to 1250 °C | 900 to 1450 °C |
| Time | 15 seconds | 10 to 20 seconds | 1 to 30 seconds |

In Table I-C, the first and second example biomass chips have the characteristics set forth in the following Table I-D:

TABLE I-D

| Characteristic of CAAB | Example |
|---|---|
| % Organic Carbon | 70-95.9% |
| Surface Area | 400-2400 m2/gram |
| Butane Activity | 10-23 |
| H:C Ratio (Stability) | 0.1-0.3 |
| O:C | 0.3-0.6 |
| Degradation Estimate | <.05% per year |
| Ash Content | <4.9 |
| Available Phosphorus | 300-800 mg/kg |
| Available Nitrogen | 2.0-6.0 mg/kg |
| Water holding Capacity | 400%-900% |
| Bulk Density | 4-12 lbs./cubic foot |
| **Characteristic** | **Example** |
| Example 1 | |
| CHIP Average Length | ~5 mm |
| CHIP Average Width | ~3/8" |
| CHIP Average Thickness | ~3/8" |
| CHIP Average Moisture Content | ~55% |
| CHIP Average Volume | ~0.422 $in^3$ |
| CHIP Average Surface Area per Weight | at least 550 $m^2$/gram |
| Example 2 | |
| CHIP Average Length | ~3" |
| CHIP Average Width | ~3/8" |
| CHIP Average Thickness | ~3/8" |
| CHIP Average Moisture Content | ~55% |
| CHIP Average Volume | ~0.422 $in^3$ |
| CHIP Average Surface Area per Weight | at least 550 $m^2$/gram |

In the example CAAB process 20, the biomass chips and liquid nitrogen compound are introduced into an updraft fixed-bed gasifier having a grated hearth. The gasifier is superheated, preferably using waste wood from forestry and lumber-making operations and air to accelerate. The chips, liquid nitrogen compound, and gasifier conditions are all predetermined based on the use of carbon product, CAAB, such as wet, untreated wood rather than optimization of product gases for energy from the feedstock. The example CAAB process 20 can eliminate the need for additional, often carbon creating, energy sources. The example CAAB process 20 also yields a biochar CAAB composition that is inexpensive and often superior as remediation media in terms of results, cost/benefit, and environmental friendliness when compared to commercial activated carbons produced using fossil fuel coal, lignite, and/or carbon releasing peat bog exploitation.

The heat is typically sufficient to superheat the biomass chips, causing the biomass chips to decompose, first with the vaporization of the moisture within the particles, followed by cellulose, hemicellulose and lastly lignin being broken down to their constituent gaseous or solid elements. Outside air may be injected into the system to superheat the biomass chips and thereby maintain the heat within the processing chamber to within a predetermined range. The combination of heat gases created by the combustion of the wood fuel heating the reactor, and air are mixed and when the green-wood chips are introduced such that steam is created within the mixing heating area. Heat rises, and the fire is hot enough that turbulence is created that further homogenizes the gases and steam, which suspends and circulates the biomass chips during the decomposition process. The resulting porous particles rise through the gaseous mix where in they sorb sufficient Nitrogen to be measurable and provide catalytic properties to the CAAB end solid product and to facilitate processing to ensure that the biomass chips remained suspended and circulating during the decomposition process. In general, the average size of the biomass chips is selected relative to the composition of the biomass chips such that the biomass chips do not fall to the hearth or grate of the updraft gasifier system during processing.

The raw CAAB composition resulting from step 40 contains a range of sizes, some of which may not be suitable for use as part of a water treatment process. In particular, as will be described in further detail below, the raw CAAB composition comprises particles above a predetermined size and particles below a predetermined size. Accordingly, in the example system 20 the raw CAAB composition is washed at step 50 and dried at step 60. The washed and dried CAAB composition is next stored at step 70. Preferably, the CAAB composition is stored in closed containers that prevent spoilage of the stored CAAB composition.

In Table I-C, first and second example refined CAAB compositions obtained from processing the first and second example biomass chips described in Table I-D according to the example CAAB process 20 have the characteristics set forth in the following Table I-E:

TABLE I-E

| Characteristic | Example |
|---|---|
| Example 1 | |
| CAAB Average Length | ~3" |
| CAAB Average Width | ~3/8" |
| CAAB Average Thickness | ~3/8" |
| CAAB Average Moisture Content | ~55% |
| CAAB Average Specific Density | |
| CAAB Average Weight | |
| CAAB Average Volume | 0.422 $in^3$ |
| CAAB Average Surface Area per Weight | at least 550 $m^2$/gram |
| Example 2 | |
| CAAB Average Length | ~3" |
| CAAB Average Width | ~3/8" |
| CAAB Average Thickness | ~3/8" |
| CAAB Average Moisture Content | ~55% |
| CAAB Average Specific Density | |
| CAAB Average Weight | |
| CAAB Average Volume | 0.422 $in^3$ |
| CAAB Average Surface Area per Weight | at least 550 $m^2$/gram |

The example refined CAAB composition created by the example CAAB process of the present invention typically contains not greater than about 4% mineral ash content, with a carbon weight fraction at least 85%, and containing no PAH, PCB, or little to non-detectable dioxin accumulation. Tars are not acceptable and the high heat with the updraft converts what tars might be formed in to elemental gases during production. Little or no sulfuric acids or cyanidic acids are created as a result of feedstock or pyrolysis conditions. The CAAB compositions of the present invention are thus safe for water filtration of water flows, such as stormwater, surface waters, groundwater, sediment and soil environments as well as in underground wells and aquifers from which irrigation or drinking waters are taken. Moreover, the CAAB composition can be milled and injected into underground areas of pollution for stabilization and removal of contaminants, such as in fracking sites, and/or injected into the root systems of trees and soils that are impacted by disease or contamination.

The CAAB compositions of the present invention are thus further safe for removal by sorbent action of CAAB of gaseous hazardous compounds such as mercury, sulfuric acids, and the like typically requiring treatment to meet the Clean Air Standards at places like Coal-Fired energy plants The example CAAB process 20 thus does not pollute the resultant CAAB compositions, rendering the CAAB compositions of the present invention safe for the primary intended use to remediate pollutants in sensitive and impacted waters, including saltwater, and soils.

The refined CAAB composition fabricated using the example CAAB process 20 can be used as a water treatment material and/or as part of a water treatment systems that can be adapted to treat a body of water containing one or more contaminants yielding treated water having a foul odor and/or unpleasant taste such as with chlorine or other treatment chemicals. The refined CAAB composition of the present invention may be used as part of improved water treatment materials, systems, and methods is flexible and can be used to treat water as close as possible to the source of contamination or to prohibit passage of contaminants beyond the point of treatment. The refined CAAB composition of the present invention may also be used as a water treatment composition or as part of a water treatment systems or method that may be tailored to treat a specific contaminant or combination of contaminants generated at a specific source of contamination. The refined CAAB composition of the present invention may further be used as a water treatment composition and/or as part of a water treatment system or method that may be tailored to accommodate the physical environment associated with the source of contaminated water. The refined CAAB composition of the present invention may also be used a soil amendment to promote Soil health, regenerate degraded soils and to sorb toxins from the soil such as herbicides, to render them bioinactive, so that plants can again grow. Moreover it has been found to increase microbial population, and increases dramatically the cation extange rate of the CAAB treated soi. CAAB can retain water and nutrients for plant use and mitigate the soil carbon losses. It can also inhibit or greatly reduce the greenhouse gases that off-gas in agricultural soils. CAAB has a half life estimated to be 1000 years, utilizing the C:O ratio, and therefore is a effective carbon reduction method when sequestered in the soils.

The refined CAAB of the present invention have a typical uptake rate about 0-30 mins for removal of contaminants from water, which is (1) orders of magnitude greater in uptake rate and (2) greater in adsorption capacity than other typically-manufactured biochars used in remediation. The refined CAAB of the present invention can be treated with metals (e.g., Mg, Al, Fe) to enhance the uptake and adsorption performance of the refined CAAB. Refined CAAB and refined CAAB modified with metals to form a metal-CAAB treatment media capable of rapidly and simultaneously removing contaminants from water including metals, both cationic and anionic forms, oils, organic pollutants, pesticides, herbicides, pharmaceuticals, nutrients such as phosphates and nitrates, toxic bacteria such as coliform and

*Enterococcus* bacteria, chemical and biologic oxygen demand, chlorine, chloramine and PFOA, PFOS which are showing up more and more in drinking water. The refined CAAB and refined CAAB modified with metals forms a cost-effective, highly affective removal media which can take the form of various embodiments and allows for high-capacity, fast removal of contaminants from water to target anionic metal or metalloid contaminants, such as Arsenic, Selenium or Agricultural Nutrients such as Phosphate and Nitrate.

II. EXAMPLE CAAB PROCESSING SYSTEM

Figure 2:
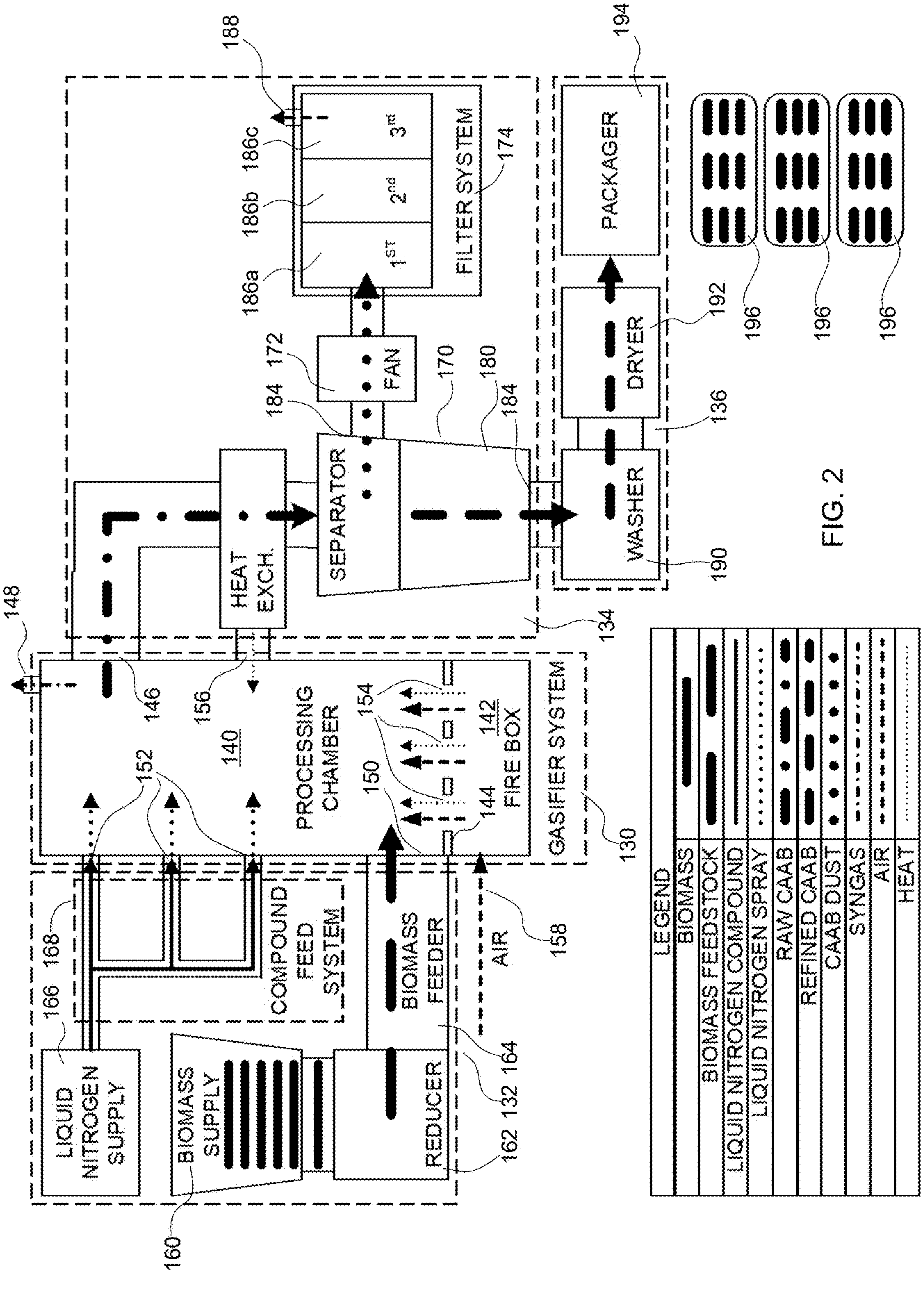
FIG. 2 is a schematic block diagram illustrating example systems and methods of producing CAAB compositions of the present invention.

Turning now to FIG. 2 of the drawing, depicted therein is an example CAAB processing system 122 of the present invention. The example CAAB processing system 120 comprises a gasifier system 130, a pre-processing system 132, a separator system 134, and a post processing system 136.

The example gasifier system 130 defines a processing chamber 140 and a firebox 142 separated by a grate 144. A primary outlet 146 allows raw CAAB material to be removed from the processing chamber 140, and a secondary outlet 148 allows gaseous material to be removed from the processing chamber 140. Biomass is introduced into the processing chamber 140 through a biomass inlet 150. A liquid nitrogen compound is introduced into the processing chamber 140 through one or more liquid nitrogen compound inlets 152. Primary heat is introduced into the processing chamber 140 through one or more primary heat inlets 154, while secondary heat is optionally introduced into the processing chamber 140 through a secondary heat inlet 156. Air is introduced into the firebox 142 through an air inlet 158.

The example pre-processing system 132 is configured to supply the biomass in a form suitable for processing using the example gasifier system 130.

The example pre-processing system 132 comprises a biomass supply container 160 suitable for storing raw biomass. The raw biomass stored in the biomass supply container 160 may or may not be suitable for direct introduction into the gasifier system 130. Examples of materials that may be used as the raw biomass may be as described above in Section I. In the example CAAB processing system 120, the dimensions and characteristics of the example raw biomass fed into the gasifier system 120 is or may be as described in Table I-A above.

If the raw biomass is suitable for direct introduction into the gasifier system 130, the raw biomass may be fed directly to a biomass feeder 162 (e.g., screw auger or injection) capable of transporting the raw biomass into the processing chamber 140 through the biomass inlet 150.

If the raw biomass is not suitable for direct introduction into the gasifier system 130, the raw biomass may be altered by, for example, size reduction. If the raw biomass takes the form of tree branches that are too large for processing by the gasifier system 130, the raw biomass may be shredded or chipped prior to introduction into the processing chamber 140. The example pre-processing system 132 includes an optional biomass reducer 164 (e.g., wood chipper, or mill) capable of reducing the size of the raw biomass prior to transport by the biomass feeder 162. As discussed above, the raw biomass should be light enough to remain in the heat convection of the processing chamber 140 of the updraft carbonizing gasifer.

The amount of raw biomass introduced into the processing chamber 140 depends on factors such as the amount, size, and nature of the raw biomass, the volume of the processing chamber 140, and the operating temperature within the processing chamber 140. Examples of temperatures at which and times during which the example biochar feed material is processed within the processing chamber 140 are described above in Table I-C.

A CAAB processing system of the present invention may be configured to operate in a batch mode, but the example CAAB processing system 120 is configured to operate in a continuous mode after steady state temperatures have been reached.

It should be noted that at least some pre-processing of the raw biomass will be performed at a remote location before processing by the example CAAB processing system 120. In this case, the size reduction may be performed prior storage in the biomass supply container 160, in which case the biomass reducer 164 may be omitted or used primarily to ensure that the size of the raw biomass processed offsite is within predetermined parameters.

The air is forced through the air inlet 158 to obtain multiple air injection jets which help maintain the heat of the fire providing the heat-energy to the reactor. The example pre-processing system 132 further comprises a catalyzing compound supply container 166 and a compound feed system 168. The liquid nitrogen compound is a catalytic, nox-reducing compound which is stored in the liquid nitrogen compound supply container 166. The compound feed system 168 is configured to deliver the liquid nitrogen compound from the liquid nitrogen compound supply container 166 to the processing chamber 140 in a form suitable for creating raw CAAB from the raw biomass.

The liquid nitrogen compound used by the example CAAB processing system 120 is a nitrogen containing composition, such as urea, having a composition and/or characteristics as described in Table I-B above.

Typically, the compound feed system 168 delivers pressurized liquid liquid nitrogen compound to the liquid nitrogen compound inlet(s) 152 such that the catalytic-enhancing liquid nitrogen compound is sprayed into the processing chamber 140 in a manner at least suitable, and preferably optimized, for formation of raw CAAB with its very fast kinetics and rates of adsorption, from the raw biomass under the conditions within the processing chamber 140.

FIG. 2 further illustrates that the example firebox 142 contains a primary heat source that causes primary heat to enter the processing chamber 140 through the primary heat inlet(s) 154 defined by the grate 144. The grate 144 is configured to allow heat to enter the processing chamber 140 while substantially preventing movement of biomass into the firebox 142. The example CAAB processing system 120 employs a primary heat source formed by burning biomass (e.g., firewood). Examples of alternative or additional primary heat sources that may be arranged in the example firebox 142 include natural gas burners, and/or [list here]. FIG. 2 also illustrates that, optionally, secondary heat may enter the example processing chamber 140 through the secondary heat inlet 156 as will be described below.

The primary heat source of the example CAAB processing system 120 is controlled to create and maintain a temperature within the processing chamber 140 within certain parameters such as within a predetermined temperature range and for a predetermined time period. The temperature is substantially continuously applied during that predetermined time period. Examples of temperature ranges within which and time periods during which the example processing chamber 140 processes the biomass chips are set forth in Table I-C.

The heat energy introduced into the reactor or operating chamber 140 causes any moisture in the biomass chips and/or the liquid nitrogen compound to turn to steam. The steam expands and causes pore development "activation" to the remain solid particle. In particular, the moving heated air within the operating chamber 140 suspends, circulates, and lifts of the biomass chips within the operating chamber 140 as the biomass chips are decomposed into solid residue and volatile products. This suspension enhances complete decomposition while also exposing the decomposing biomass chips to the gases and catalytical N gas added from side ports into the mixing and gaseous zones.

In the example gasifier system 130, the liquid nitrogen catalyzing compound is sprayed into the operating chamber 140 and, because of the operating temperature within the operating chamber 140, immediately transforms into gases. The liquid nitrogen compound in gaseous form comes into contact with, or is exposed to, the suspended and circulating decomposing biomass solid residue such that the liquid nitrogen compound the solid reformed feedstock residue is impregnated and/or at least partly coated with a catalyst capable of accelerating a desired chemical reaction. At this point, raw CAAB has been formed.

The characteristics of the biomass material (e.g., physical size and composition), and operating temperatures within the operating chamber 140 are such that the biomass material is thermally decomposed under controlled conditions (e.g., pyrolysis) to produce a solid residue in the form of carbon (or char) and volatile products in the form of synthesis gas (e.g., syngas). The biomass chips and temperature and time period associated with the example operating chamber 140 yields as a biproduct of the CAAB syngas consisting primarily of hydrogen, carbon monoxide, and carbon dioxide. In the example CAAB processing system 120, the syngas exists the operating chamber 140 through the secondary outlet 148. The syngas biproduct has many potential uses and may be collected for use or sale.

FIG. 2 illustrates that the example post-processing system 136 comprises a solids separator 170, a fan 172, a filter system 174, and a heat exchanger 176. As described above, the volatile compounds created during decomposition of the biomass exit the operating chamber 140 through the secondary outlet 148. In the example CAAB processing 120, the fan 174 continuously draws air from the operating chamber 140. The raw CAAB, which is lighter than the undecomposed biomass chips, rises to the top of the operating chamber 140 and exits the operating chamber 140 with the moving air through the primary outlet 146.

The purpose of the solids separator 170 is to separate the raw CAAB into refined CAAB and dust. Biomass exposed to high temperature with the oxidizing potential of air, vaporizes much of the product, but larger soils are typically very high carbon, while the tiniest of particles are often mineral ash, minerals that were once part of the structure of the wood feedstock, still in solid form, as tiny particulate matter mixed with carbon dust also created in the process. In particular, the size and shape of the biomass typically varies somewhat, and the biomass may decompose unevenly, resulting in a wide range of particulate size of the raw CAAB created by the decomposition process within the processing chamber 140. Not all of the raw CAAB is useful for all scenarios. In the context of certain types of water treatment, CAAB should have a physical size above a predetermined minimum. In the context of the example CAAB processing system 120, the term "refined CAAB" refers to the portion of the raw CAAB the size of which is above that predetermined minimum and the term "CAAB dust" refers to that portion of the raw CAAB the size of which is below that is below that predetermined minimum.

While CAAB dust may not be suitable for all of the same applications as refined CAAB, CAAB dust may have other uses such as different types of water treatment systems and possibly as a soil amendment.

The example solids separator 170 is thus configured to separate the raw CAAB into the refined CAAB and CAAB dust. One example of a solids separator that may be used as the solids separator 170 is a cyclonic separator that arranges the raw CAAB in a separation chamber 180 above a primary solids removal outlet 182 while operating the fan 172 to draw air from the separation chamber 180 through a secondary solids removal outlet 184. Lighter (e.g., smaller) particulate will be drawn out of the separation chamber 180, while heavier (e.g., larger) particulate will fall out of the separation chamber 180 through the primary solids removal outlet 182. The example solids separator 170 effectively separates the raw CAAB into refined CAAB that exits the example solids separator 170 through the primary solids removal outlet 182 and CAAB dust that exits the example solids separator 170 through the secondary solids removal outlet 184. The example CAAB dust is removed from the air flowing out of solids separator 170 by the filter system 174. The example filter system 174 defines one or more filtering stages **186*a*, 186*b*, and 186*c* and an air removal outlet 188**.

The refined CAAB may next be washed by a washer 190 to remove any remaining dust and dried using a dryer 192. Ideally, the refined CAAB includes no more than 15% by volume, dust size particles pre-washing, or mechanical sizing.

When washed and dried, the refined CAAB has dimensions as defined in Table I-E above. The example refined CAAB may, as an example, have an average particle size within a refined CAAB range of 2.0 mm to 6.0 mm in diameter. The washed and dried refined CAAB is then packaged (1) stored in a clean dry closed container, (2) put into a wattle, sock, bag or insert for filtration environmental services, (3) mixed with enhancing solutions for enhancing the removal capabilities of the CAAB for anionic contaminants and Agricultural nutrients, mixed with other specified medias such as oyster shells, perlite, gravel sand and/or chitosan, prescribed microbes/fungi, and/or wood chips, (5) packaged by a packager system 194 in packages 196. As an example, the packages may take the form of bags that may be arranged on pallets for ease of transportation, storage, and use.

III. EXAMPLE MODIFIED CAAB TREATMENT PROCESSES

CAAB material fabricated as described above has many positive properties and may be used in the refined CAAB or CAAB dust form for many purposes. These properties can be enhanced by combining the CAAB as described above with an enhancing solution.

The enhancing solution used to enhance the CAAB material may, for example, be a metal solution formulated to target (e.g., remove) anions and nutrients such as Phosphate and Nitrate. Examples of metal solutions that can be used as the enhancing solution to obtain a modified CAAB composition of the present invention include solutions of: Magnesium (Mg), Aluminum (Al), Iron (Fe), [complete list of metals/with details of solutions as appropriate].

More generally, the metal-CAAB media strongly binds with phosphate and nitrate and reduce the phosphate and nitrate entering into the waters and/or migrating in soils or ground water, the metal-CAAB media is proportioned to reduce concentrations of As, Pb, Cd, Cu, Zn, phosphates, organic pollutants, hydrocarbons, coliform and *Enterococcus* bacteria, from contaminated water until it reaches maximum adsorption capacity.

Typically, the mass percentage of each metal in the CAAB can be between 1-20% by weight of the modified CAAB material.

First and second example methods or forming modified CAAB compositions of the present invention will now be described with reference to FIGS. 3A and 3B.

First Example Modified CAAB Treatment Process

Figure 3A:
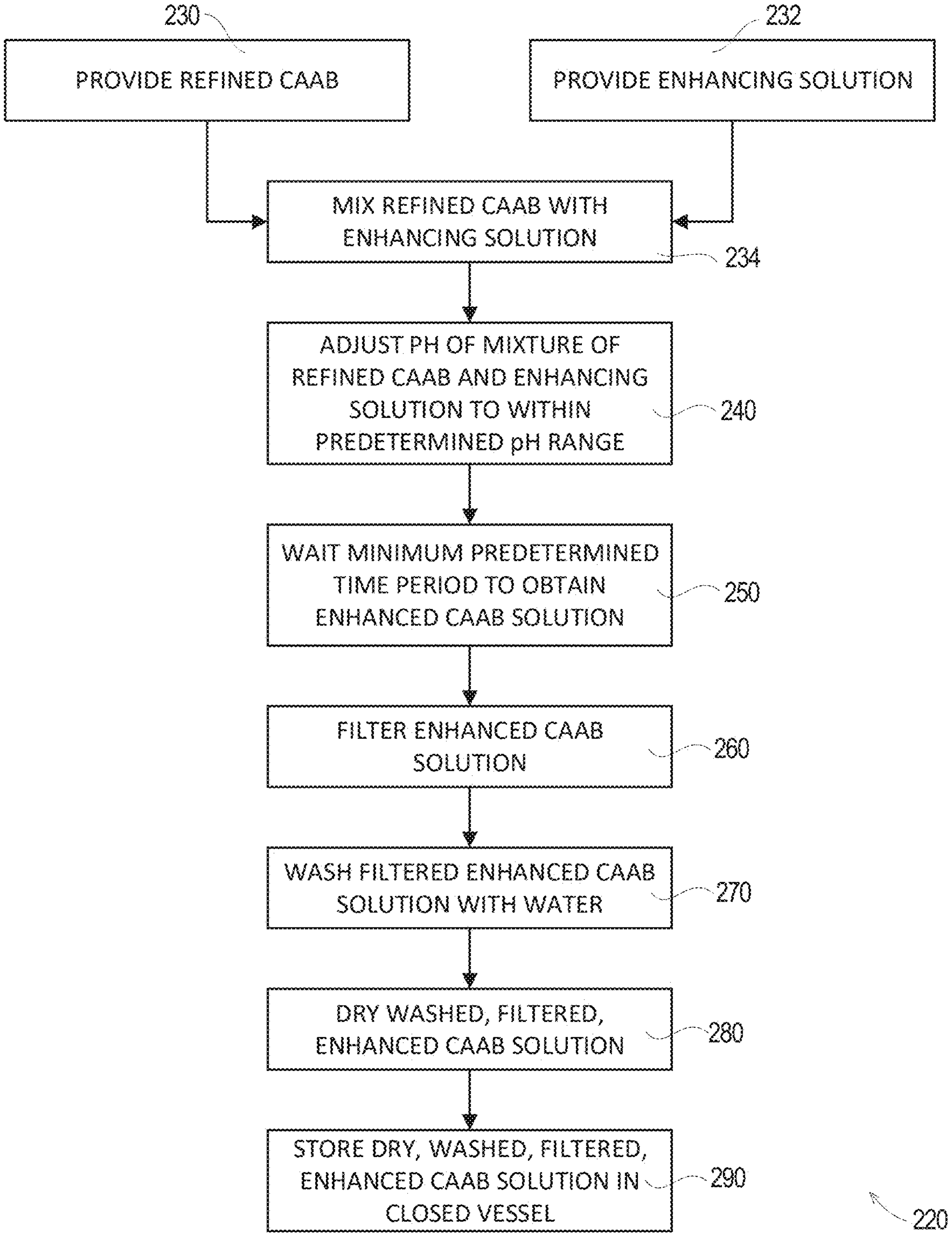
FIG. 3A is a process flow diagram depicting a first example method of producing modified CAAB compositions of the present invention.

FIG. 3A illustrates a first example CAAB treatment process 220 that may be used to form a first example modified CAAB composition of the present invention. The first example CAAB treatment process 220 comprises the steps of providing refined CAAB at step 230 and providing a first example enhancing solution at step 232. In the first example CAAB treatment process 220, the refined CAAB may be a CAAB material as produced by the example CAAB process 20 or the example CAAB processing system 120.

The first example CAAB treatment process 220 yields magnesium and aluminum impregnated CAAB (Mg/Al-CAAB). The first example enhancing solution is a salt solution using $Al^{3+}$ and $Mg^{2+}$ salts dissolved in water. The mass percentage of each metal in the biochar is, for example, approximately 10%. The mass percentage of each metal is typically within a first range of approximately 5% to 15% but may be within a second range of 1% to 20%. The following Table III(a)-A contains an example of the first example enhancing solution employed by the first example CAAB treatment process 220, with components being described by as a percentage by weight of the first example enhancing solution.

TABLE III(a)-A

| Component | Example | First Range | Second Range |
|---|---|---|---|
| $Al^{3+}$ salts | 5% | 5-20% | 1-40% |
| $Mg^{2+}$ salts | 5% | 5-20% | 1-40% |
| pH | 10.5 | 10.25-10.75 | 10-11 |

The refined CAAB and first example enhancing solution are then mixed at step 234 to obtain a modified CAAB mixture. At a step 240, the pH of the modified CAAB mixture is adjusted to approximately 10.5 using NaOH to obtain a pH adjusted modified CAAB mixture. The pH of the pH adjusted modified CAAB mixture is typically within a first range of 10.25 to 10.75 and, in any event, should be within a second range of 10 to 11.

The pH adjusted modified CAAB mixture is next allowed to sit at step 250 for a predetermined time period to obtain a modified CAAB solution. In the example CAAB modification process 220, the predetermined time period is typically 24 hours but is within a first range of 20 to 28 hours and in any event should be within a second range of 10-40 hours.

After the predetermined time period, the modified CAAB solution is filtered at step 260 to obtain a filtered modified CAAB solution. The filtered modified CAAB solution is washed with water at step 270 and allowed to dry for a second predetermined time period. In the example CAAB modification process 220, the predetermined time period is typically 48 hours or within a first range of 36 to 60 hours and in any event should be within a second range of 24 to 72 hours.

The washed, filtered, modified CAAB solution is dried at step 280 to obtain the first example modified CAAB composition. The first example modified CAAB composition is packaged for storage in a closed vessel at step 290.

Second Example Modified CAAB Treatment Process

Figure 3B:
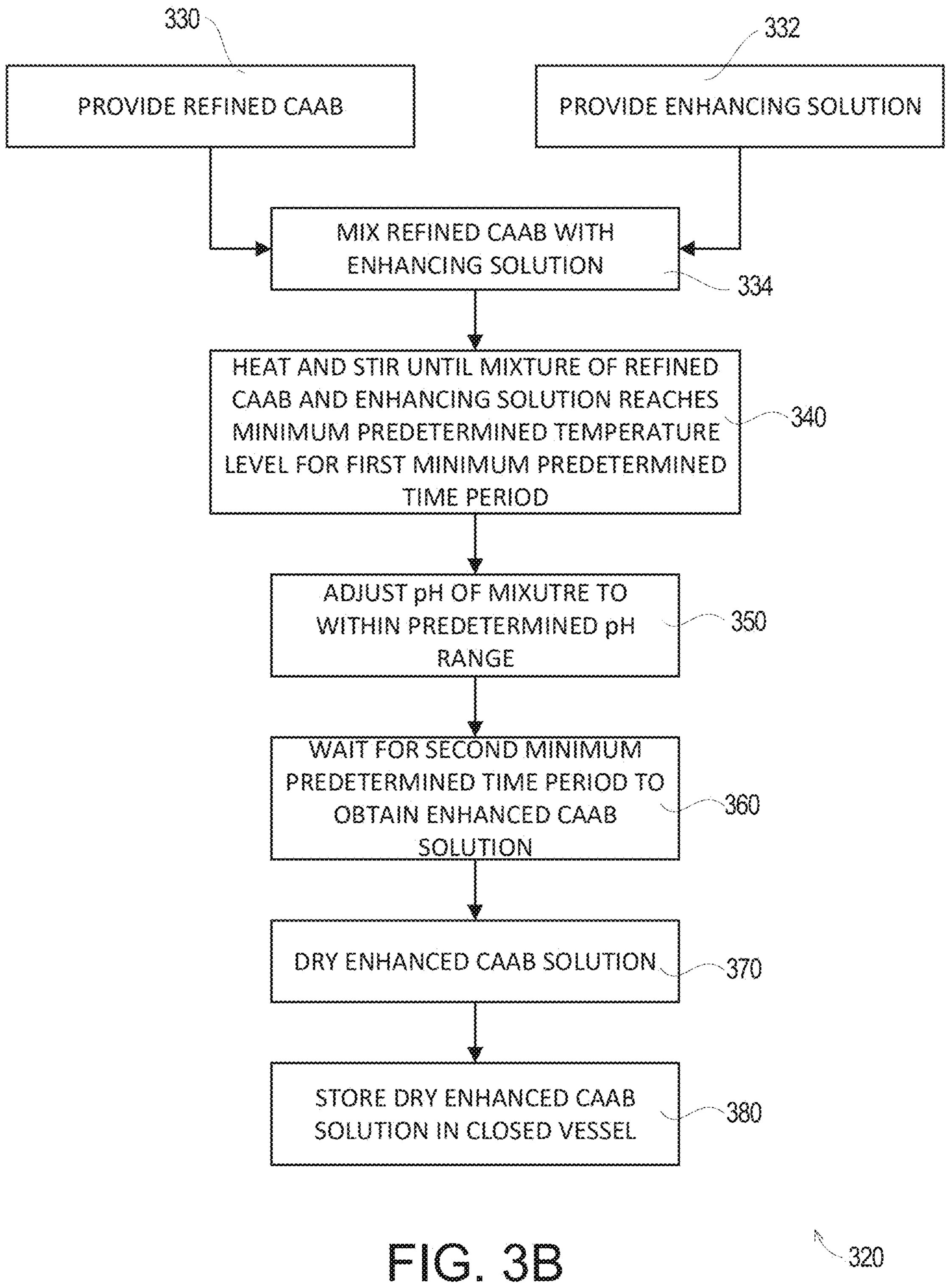
FIG. 3B is a process flow diagram depicting a second example method of producing modified CAAB compositions of the present invention.

FIG. 3B illustrates a second example CAAB treatment process 320 that may be used to form a second example modified CAAB composition of the present invention. The second example CAAB treatment process 320 yields iron-oxide impregnated CAAB (Fe-CAAB).

The second example CAAB treatment process 320 comprises the steps of providing refined CAAB at step 330 In the second example CAAB treatment process 320, the refined CAAB may be a CAAB material as produced by the example CAAB process 20 or the example CAAB processing system 120. In the second example CAAB treatment process, the refined biochar is initially suspended in water.

At step 332, a second example enhancing solution is provided. The second example enhancing solution results in the precipitation of magnetite ($Fe_3O_4$) into the biochar forming the CAAB material. Accordingly, at step 332, solutions of $Fe^{3+}$ and $Fe^{2+}$ are prepared and then mixed into the water and refined CAAB suspended therein. The $Fe^{3+}$ and $Fe^{2+}$ solutions are prepared by adding $Fe^{3+}$ and $Fe^{2+}$ to water and then stirring at a first predetermined temperature for a first predetermined time period. The example first predetermined temperature is approximately 65° C. but in any event should be within a first range of 62.5 to 77.5° C. or within a second preferred range of 60-70° C. The first predetermined time period is approximately 5 minutes but should be within a first range of 4 to 6 minutes or a second range of 3-10 minutes. The following Table III(a)-B contains an example of the first example enhancing solution employed by the second example CAAB treatment process 320, with components being described by as a percentage by weight of the first example enhancing solution.

TABLE III(a)-B

| Characteristic | Example | First Range | Second Range |
|---|---|---|---|
| $Fe^{3+}$ solution | 10% | 5-20% | 1-40% |
| $Fe^{2+}$ solutions | 10% | 5-20% | 1-40% |
| pH | 10.5 | 10.25-10.75 | 10-11 |

At a step 340, the combined $Fe^{2+}/Fe^{3+}$ solution is then slowly poured into the aqueous suspension of biochar at a second predetermined temperature and slowly stirred for a second predetermined time period. The example first predetermined temperature is approximately 20° C. but in any event should be within a first range of 15 to 25° C. or within a second preferred range of 10 to 90° C. The first predetermined time period is approximately 30 minutes but should be within a first range of 20 to 40 minutes or a second range of 15 to 60 minutes.

To obtain a pH adjusted modified CAAB mixture, at a step 350 a NaOH solution is next added at step dropwise until a predetermined pH level of approximately 10.5 is achieved. The predetermined pH level of the pH adjusted modified CAAB mixture is typically within a first range of 10.25 to 10.75 and, in any event, should be within a second range of 10 to 11.

The resulting $Fe_3O_4$-magnetized CAAB (Fe-CAAB) is filtered, repeatedly washed with distilled water, followed by three ethanol washes, vacuum filtration and overnight oven drying at 50° C.

The mass percentage of the metal in the modified refined CAAB composition is, for example, approximately 10%. The mass percentage of each metal is typically within a first range of approximately 5% to 15% but may be within a second range of 1% to 20%.

After the second predetermined time period, the modified CAAB solution is dried at step 370 to obtain a modified CAAB composition. The modified CAAB composition is packaged for storage in a closed vessel at step 380.

IV. EXAMPLE CAAB COMPOSITIONS

Figure 4C:
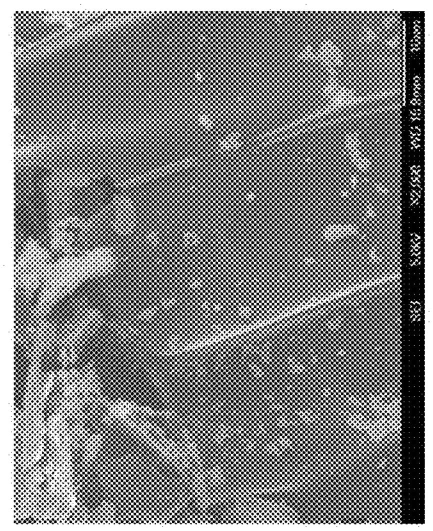
FIG. 4C is a scanning electron microscope (SEM) image of the structure of a second modified refined CAAB composition of the present invention.
Figure 4B:
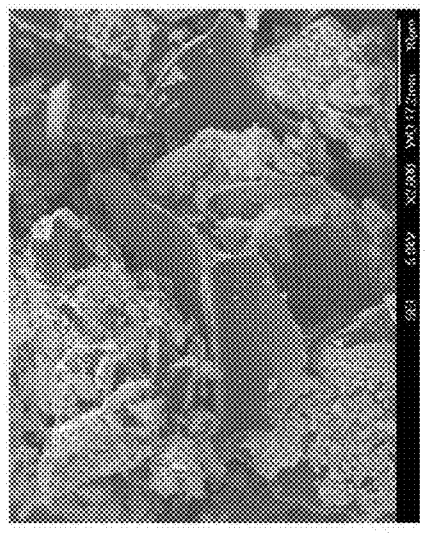
FIG. 4B is a scanning electron microscope (SEM) image of the structure of a first modified refined CAAB composition of the present invention.
Figure 4A:
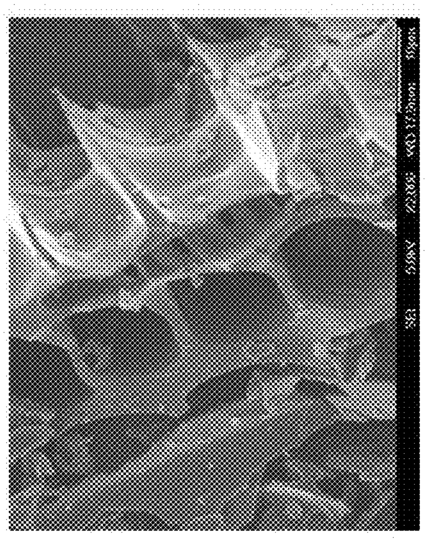
FIG. 4A is a scanning electron microscope (SEM) image of the structure of a refined CAAB composition of the present invention.

The FIGS. 4A, 4B, and 4C, describe first, second, and third examples, respectively, of CAAB compositions constructed in accordance with, and embodying, the principles of the present invention.

First Example CAAB Composition

FIG. 4A is a scanning electron microscope photograph illustrating a structure of an example of the first example CAAB composition described in Tables IV(a)-A and IV(a)-B. In particular, FIG. 4A illustrates an SEM image of the surface morphology of the first example CAAB composition, which is simply the refined CAAB without included metals. The wood cell morphology originally present in the wood chips is clearly still present in FIG. 4A. FIG. 4A illustrates that the refined CAAB of the first example CAAB composition defines relatively large micropores.

Second Example CAAB Composition

The second example CAAB composition depicted in FIG. 4B is a CAAB composition as produced by the example CAAB processing process and/or systems described in Sections 1 and 2 herein and which has further been enhanced by a treatment process as described in Section III (a) of this discussion.

FIG. 4B is a scanning electron microscope photograph illustrating a structure of an example of the second example CAAB composition. In particular, FIG. 4C illustrates an SEM image of the surface morphology of the second example CAAB composition (Mg/AI/CAAB). The wood cell morphology originally present in the wood chips as observed in FIG. 4A is clearly still present in FIG. 4B. However, FIG. 4B illustrates morphological changes due to precipitation of Mg/Al as compared to the relatively large micropores of the unmodified refined CAAB. FIG. 4B further shows very small particles widely distributed within the refined CAAB and also, in some locations, aggregated.

Third Example CAAB Composition

The third example CAAB composition depicted in FIG. 4C is a CAAB composition as produced by the example CAAB processing process and/or systems described in Sections 1 and 2 herein and which has further been enhanced by a treatment process as described in Section III(2) of this discussion.

FIG. 4C is a scanning electron microscope photograph illustrating a structure of an example of the third example CAAB composition described in Tables C1 and C2. In particular, FIG. 4C illustrates an SEM image of the surface morphology of the third example CAAB composition (Fe/CAAB). The wood cell morphology originally present in the wood chips as observed in FIG. 4A is clearly still present in FIG. 4C. However, FIG. 4C illustrates morphological changes due to precipitation of Fe as compared to the relatively large micropores of the unmodified refined CAAB. FIG. 4C further shows very small particles widely distributed within the refined CAAB and also, in some locations, aggregated.

V. EFFICACY OF EXAMPLE CAAB COMPOSITIONS

The example CAAB compositions of the present invention provide a number of quantifiable benefits when used to treat water and clearly visible benefits when used as a soil amendment. Several examples of these benefits will be discussed below with reference to FIGS. 5-9.

Removal of 4-nitroaniline from Influent Water

Figure 5:
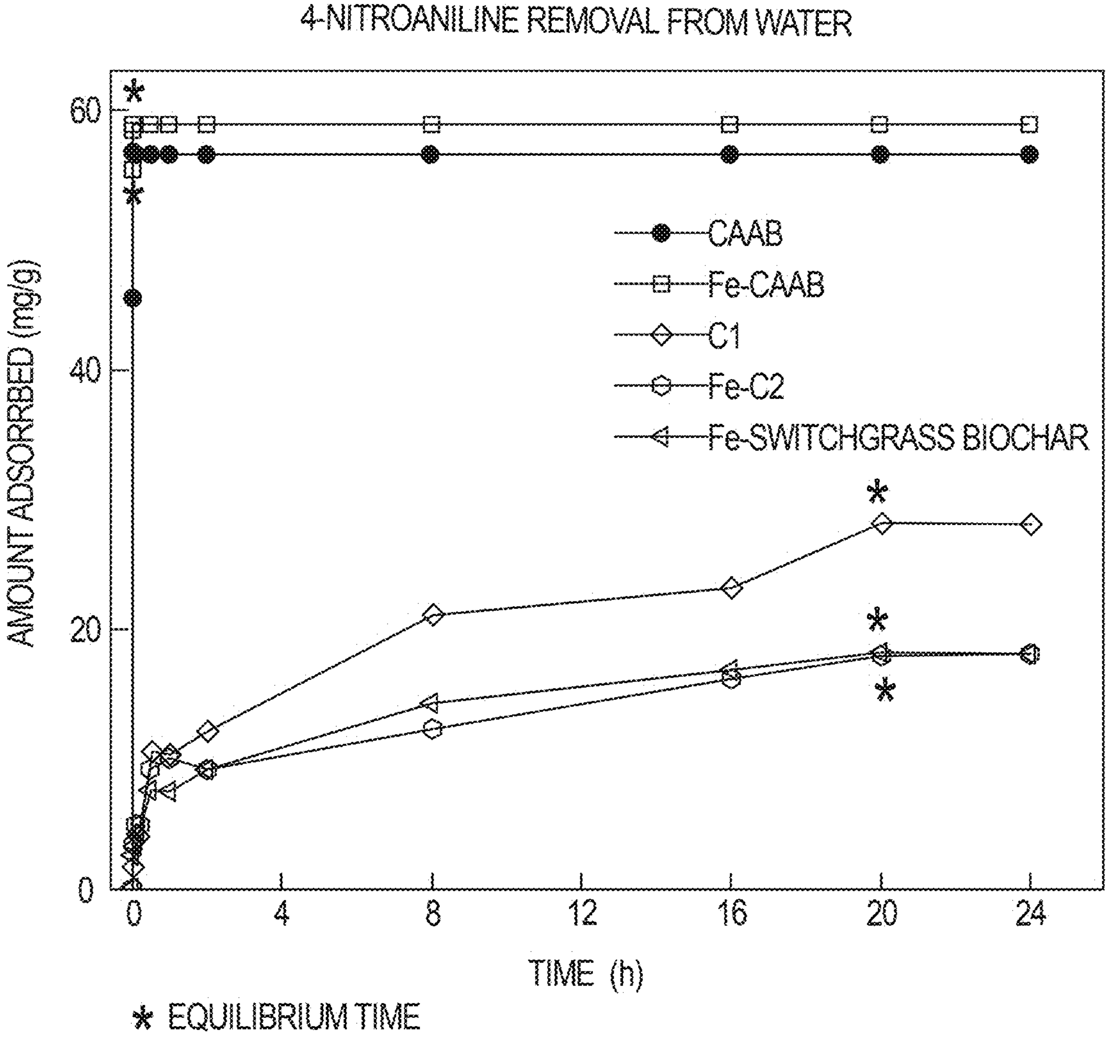
FIG. 5 is a chart illustrating a comparison of removal of 4-nitroaniline adsorbed at pH 5 over time from treated water using an example of the refined CAAB of the present invention, an example of the second enhanced refined CAAB composition of the present invention, a first example carbon composition, a modified second example carbon composition, and an example modified biochar composition.

Turning now to FIG. 5 of the drawing, depicted therein is a chart depicting removal of a contaminate, 4-nitroaniline, from water using various treatment compositions. In particular, FIG. 5 illustrates a comparison of the removal of 4-nitroaniline adsorbed at pH 5 over time among five separate treatment materials: (1) an example of the refined CAAB of the present invention, (2) an example of the second enhanced refined CAAB composition of the present invention, (3) a first example carbon composition, (4) a modified second example carbon composition, and (5) an example modified biochar composition. All of these treatment materials were used to treat water contaminated with 4-nitroaniline from the same source and using the same treatment system.

FIG. 5 illustrates that the example refined CAAB of the present invention almost immediately removes approximately 58 mg/g of the 4-nitroaniline and that the second enhanced refined CAAB composition almost immediately removes approximately 60 mg/g of the 4-nitroaniline. The first example carbon composition removes approximately 24 mg/g of the 4-nitroaniline after approximately 24 hours. The modified second example carbon composition removes approximately 24 mg/g of the 4-nitroaniline after approximately 17 hours. The example modified biochar composition removes approximately 17 mg/g of the 4-nitroaniline after approximately 24 hours. FIG. 5 further illustrates that the efficacy of all of the treatment materials appears substantially to plateau at the values set forth above within the 24 hour test period.

FIG. 5 illustrates that the refined CAAB of the present invention and the second enhanced refined CAAB composition both remove substantially more of the 4-nitroaniline and do so much quicker than the first and second example carbon compositions and the example modified biochar composition. The refined CAAB of the present invention and the second enhanced refined CAAB composition of the present invention are thus superior to the alternative conventional treatment materials tested as shown in FIG. 5.

FIG. 5 thus illustrates a comparison of rates, equilibrium times, and amount of 4-nitroaniliene adsorbed at pH 5 with different media. The first, second, and third example CAAB compositions have an uptake rate of about 0-30 mins for removal of contaminants from water, which is orders of magnitude greater in uptake rate and greater in adsorption capacity than other typically-manufactured biochars used in remediation. 4-nitroaniliene is common pharmaceutical found in water which is harmful to human and animals. The CAAB and Fe-CAAB, had far higher adsorption capacities than the other commercial available biochars studied (e.g., C1, Fe—C2, Fe-Switchgrass biochar). For example, CAAB and Fe-CAAB had adsorption capacities of 57 and 59 mg/g, respectively, compared to 2-28 mg/g for 4-nitroaniliene using the three other biochars. CAAB and Fe-CAAB also had far faster uptake kinetics of the analytes compared to all the other biochar adsorbents. For all analytes studied, sorption equilibrium (uptake rate) using CAAB, Fe-CAAB, and Mg/AI-CAAB were reached within 2 min compared to 4-20 h for the other 3 biochars studied. Similar results were observed in removal of lead, cadmium, and salicylic acid. In all cases, the adsorption capacity and uptake rate of the CAAB and modified CAAB exceeds that of all other materials.

Removal of Various Metals from Water

Figure 6:
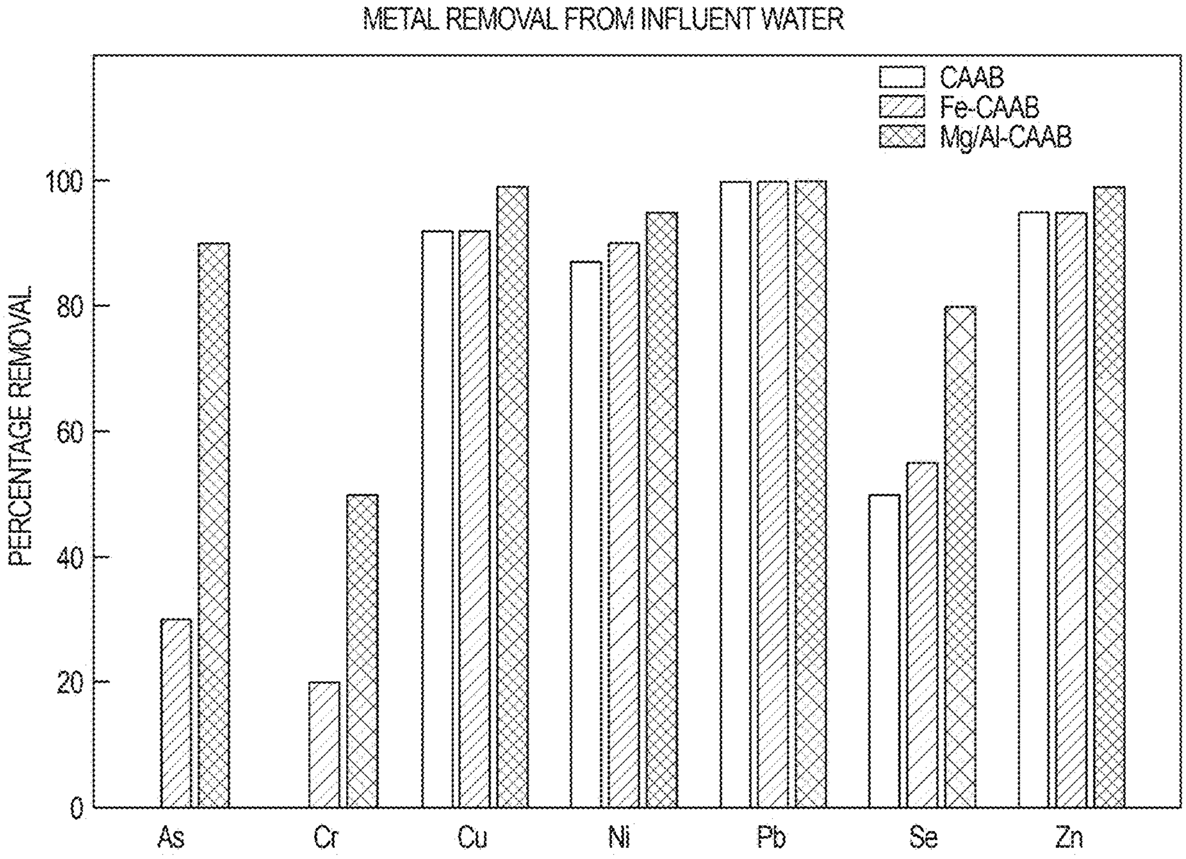
FIG. 6 is a bar chart illustrating removal of various metals from influent water using an example of refined CAAB composition of the present invention, an example of the first modified refined CAAB composition of the present invention, and an example of the second modified refined CAAB composition of the present invention.

FIG. 6 compares the removal of the following metals from water to be treated by the first, second, and third example CAAB compositions described in Section IV above: (1) Arsenic (As); (2) Chromium (Cr); Copper (Cu); Nickel (Ni); Lead (Pb); Selenium (Se); and Zinc (Zi). All of these treatment materials were used to treat water contaminated with the listed metals from the same source and using the same treatment system.

FIG. 6 illustrates that the unenhanced first example CAAB composition is ineffective at removing Arsenic and Chromium from the influent water but has some effectiveness when used to Copper, Nickel, Lead, Selenium, and Zinc from the influent water. The second and third example CAAB compositions, which have been enhanced, remove all of the listed metals to some degree. While the second example CAAB composition is as effective or almost as effective at removing Copper, Nickel, Lead, and Zinc as the third example CAAB composition, the third example CAAB composition is the most effective at removing all of the listed metals.

The cost of producing the first, second, and third example CAAB compositions may vary, so FIG. 6 allows the example CAAB compositions of the present invention to be selected as appropriate for removing one or more metals from soil, sediment, or water. For example, if the impacted water includes Arsenic or Selenium at least one of the second and third example CAAB compositions of the present invention must be used to remove these metals. However, if the body of influent water does not include Arsenic or Cromium, any one or more of the first, second, and third example CAAB compositions may be used to at least some effect.

FIG. 6 thus shows the removal of different metals from influent water using the first (CAAB), second (Mg/AI-CAAB), and third (Fe-CAAB) example CAAB compositions of the present invention. It is not necessary to use both CAAB and –CAAB media for treatment of many influent water from many sources because both of those CAAB media types (non-metal and metal) can remove metals from water including but not limited to Copper (Cu), Nickel (Ni), lead (Pb), Selenium (Se), and Zinc (Zn). But to remove arsenic (As) and chromium (Cr), a metal-CAAB type of CAAB composition of the present invention must be employed as shown in FIG. 6.

I. c) Removal of Various Bacteria from Influent Water

Figure 7:
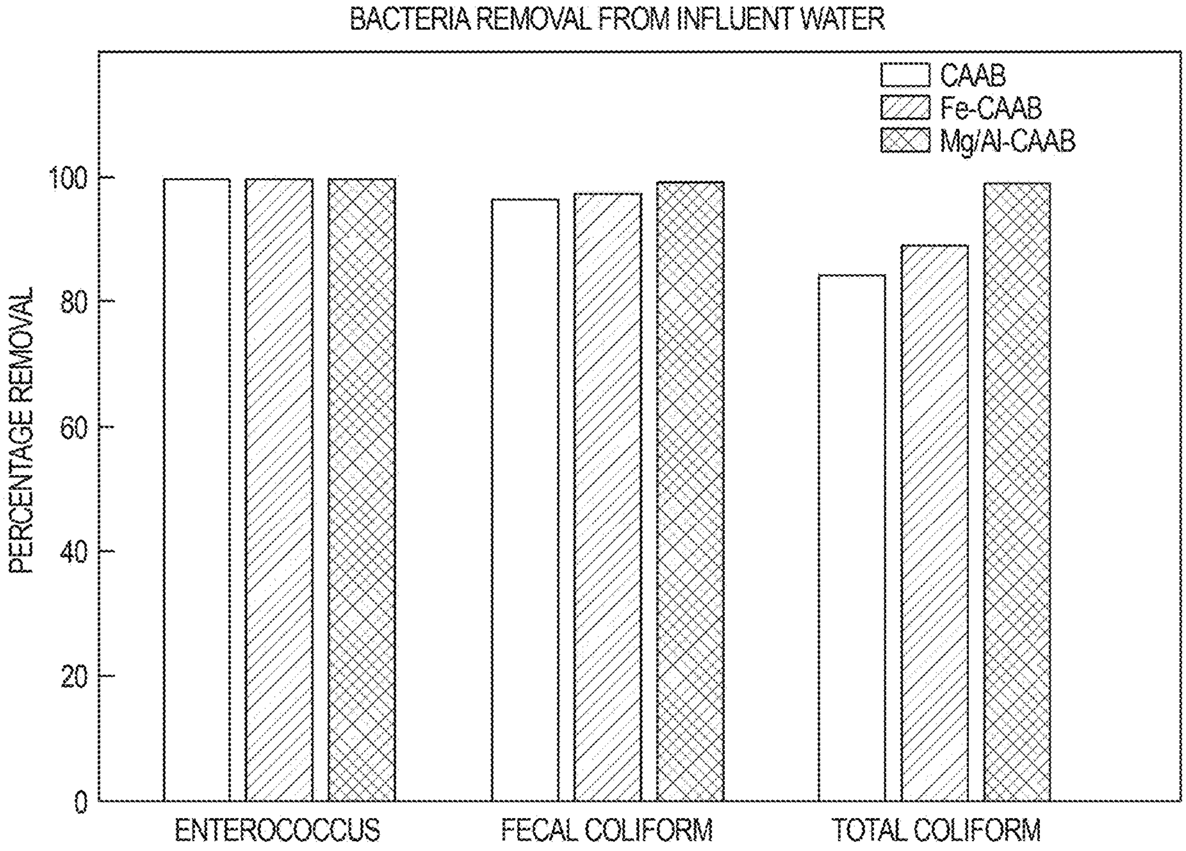
FIG. 7 is a bar chart illustrating removal of various bacterial organisms from influent water using an example of refined CAAB composition of the present invention, an example of the first modified refined CAAB composition of the present invention, and an example of the second modified refined CAAB composition of the present invention.

FIG. 7 illustrates that the unenhanced first example CAAB composition and the enhanced second and third example CAAB compositions are all quite effective at removing bacteria from the water. The first example CAAB composition (refined, unmodified) removes substantially all of the *Enterococcus* and fecal coliform bacteria and approximately 84% of the total coliform from the water. The second and third example CAAB compositions, which have been enhanced as described above, remove substantially all of the *Enterococcus* and fecal coliform bacteria. The second example CAAB composition (modified to include Iron (Fe)) removes approximately 90% of the total coliform from the impaired water, while the third example CAAB composition (modified to include Aluminum (Al)) removes approximately 100% of the total coliform from the contaminated water.

The cost of producing the first, second, and third example CAAB compositions may vary, so FIG. 7 allows the example CAAB compositions of the present invention to be selected as appropriate for removing one or more bacteria from influent water. For example, if the influent water includes *Enterococcus* or fecal coliform, any of the first, second, and third CAAB compositions may be employed. However, to remove substantially all of the coliform bacteria present in the influent water, the third example CAAB composition is preferable.

FIG. 7 shows that the removal percentage is nearly 100% for fecal coliform and *Enterococcus* bacteria for both non-metal CAAB compositions and metal-CAAB compositions of the present invention.

I. d) Removal of Phosphorus from Influent Water

Figure 8:
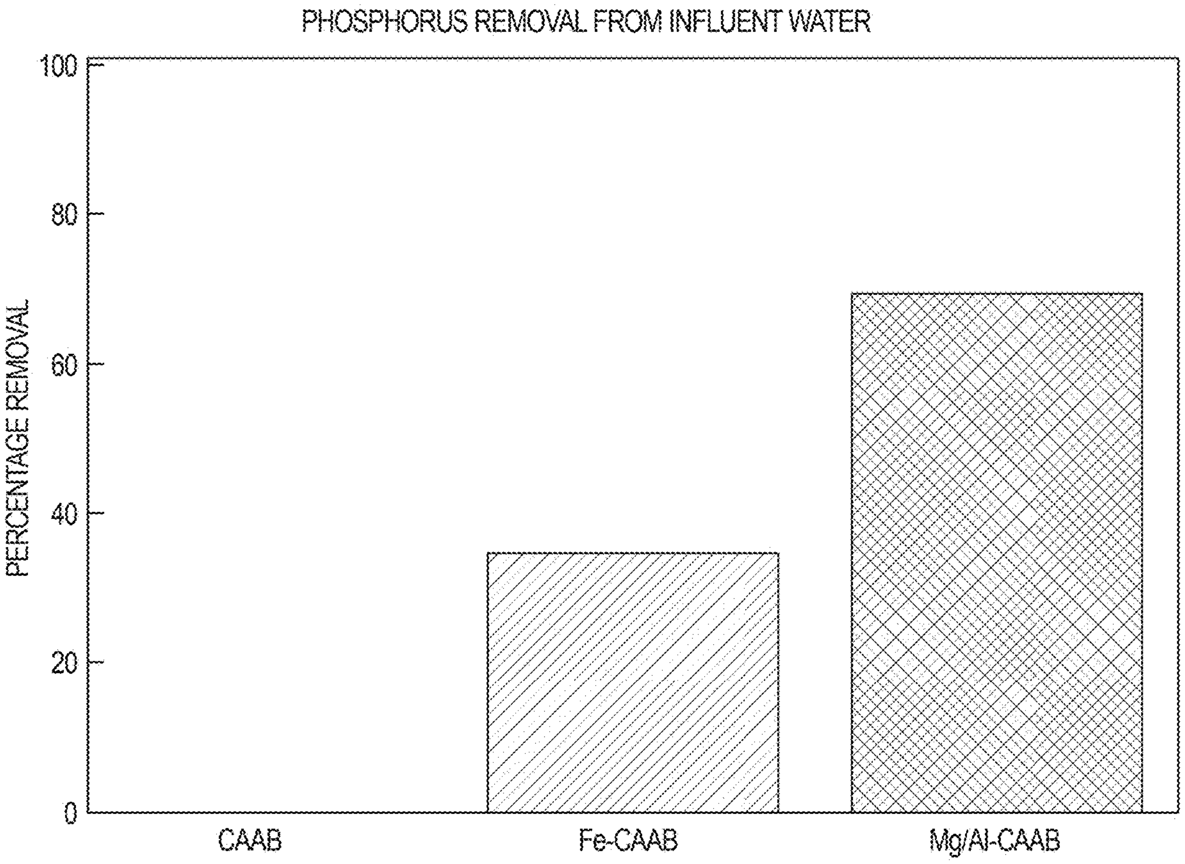
FIG. 8 is a bar chart illustrating removal of phosphorous from influent water using an example of refined CAAB composition of the present invention, an example of the first modified refined CAAB composition of the present invention, and an example of the second modified refined CAAB composition of the present invention.
Figure 9:
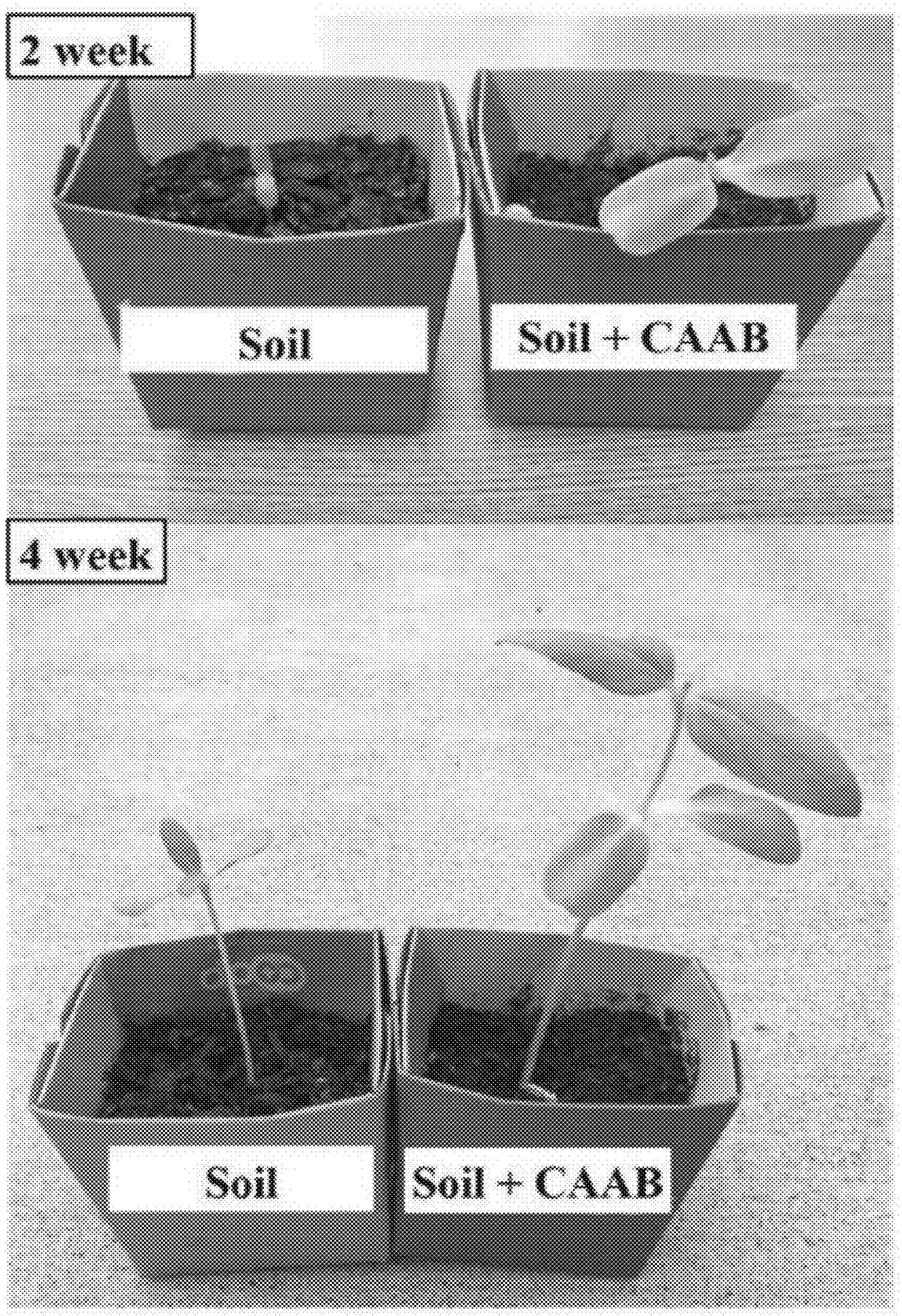
FIG. 9 contains photographs comparing plant growth associated with unamended soil and soil amended with of an example CAAB compositions of the present invention at two weeks and four weeks.

FIG. 8 illustrates that the unenhanced first example CAAB composition is ineffective at removing phosphorus from influent water but that the enhanced second and third example CAAB compositions are both at least somewhat effective at removing phosphorus from the influent water. The second example CAAB composition (modified to include Iron (Fe)) removes approximately 36% of the phosphorus from the influent water, while the third example CAAB composition (modified to include Aluminum (Al)) removes approximately 68% of the phosphorus from the influent water.

FIG. 8 suggests that possibly the second example CAAB composition and certainly the third example CAAB composition should be selected as appropriate for removing water in which phosphorus is a problematic contaminate.

Accordingly, to remove phosphate and nitrates, the metal-CAAB composition must be employed as shown in FIG. 8.

I. e) Use of Combinations of the First, Second, and Third Example CAAB Compositions FIG. 6-8 suggest that one or more of the first, second, and third example CAAB compositions may be combined to obtain optimal water treatment at minimal cost. For example, any two or more of the first, second, and third example CAAB compositions may be combined by blending two or more of the first, second, and third example CAAB compositions in any combination to form a blended water treatment material. Typically, the cost of producing the first example CAAB composition will be lower than the cost of the second and third example CAAB compositions because it is not treated to form a modified CAAB composition. In this case, the first CAAB composition may be used as a base (e.g., highest percentage by weight), with one or both of the second and third example CAAB composition employed as necessary to treat influent water having a predetermined contaminate profile defining the presence, absence, and/or average quantity of any relevant contaminate.

Any two or more of the first, second, and third example CAAB compositions may additionally be combined by providing separate containers for two or more of the first, second, and third example CAAB compositions and combining the containers at the point of treatment. When containerized, such as in bags and/or wattles as described in U.S. Patent Application, make targeting differing and polar opposite materials for removal possible in the same treatment structure or lid model. For example, layering of bags or wattles isolates different COC and together, the layered bags or wattles remove most of problem contaminants in the influent water.

The cost of producing the unmodified first example CAAB composition will typically be lower than the cost of producing the modified second and third example CAAB compositions. Accordingly, as an example, when separate containers of the first, second, and/or third example CAAB materials are provided, one or more containers containing the first CAAB composition may be arranged to come into contact with the impaired water first and thereby reduce the bulk of certain contaminates. After the bulk of certain contaminates has been removed by the container(s) of the first example CAAB composition, containers containing one or both of the second and third example CAAB composition are arranged such that the contaminated water is exposed to and treated by as necessary by the second and third example CAAB compositions. Separate containers containing a single CAAB composition of the present invention may be arranged to treat influent water having a predetermined contaminate profile defining the presence, absence, and/or average quantity of any relevant contaminate.

When supported to come into contact with impaired sediments or water, the CAAB compositions of the present invention can also remove contaminates that pass through conventional water treatment materials, systems, and methods, including contaminates that are not yet monitored or limited by regulation (e.g., pharmaceuticals).

I. f) Use of One or More of the First Example CAAB Composition as a Soil Amendment The raw CAAB, refined CAAB, and CAAB dust compositions are good for soil amendment purpose and isolation of soil, water or plant pollutants, chemical, physical or biological. The high-porosity structure of the CAAB materials and compositions of the present invention also increases potential plant growth by increasing the water retention ability of the soil, increasing the microbial activity, and reducing leaching of nutrients from the soil.

FIGS. 9A and 9B depict an example of plant growth comparing growth of a plant growing in soil that does not contain a CAAB composition of the present invention as a soil amendment (non-CAAB plant) as a control plant and a plant growing in soil containing an example CAAB composition as a soil amendment (CAAB plant). In particular, the non-CAAB plant is shown on the left in FIGS. 9A and 9B, while the CAAB plant is shown on the right in FIGS. 9A and 9B illustrates growth when the soil is amended to include an example CAAB composition of the present invention. FIG. 9A shows the growth of the non-CAAB plant and the CAAB plant at 2 weeks, while FIG. 9B shows the growth of the non-CAAB plant and the CAAB plant at 4 weeks. Other than the use of CAAB as a soil amendment for the CAAB plant, the non-CAAB plant and the CAAB plant were plant in similar soil and tended in the exact same manner.

The plant on the left (the non-CAAB plant) is clearly growing at a slower rate than the plant on the right (the CAAB plant) in both FIGS. 9A and 9B. FIGS. 9A and 9B thus clearly show that the CAAB composition of the present invention, when added to soil as a soil amendment, results in accelerated plant growth.

If not the CAAB used for water remediation purposes is not contaminated with anything hazardous to health and well-being of receiving soils or humans, used CAAB could be reutilized as a soil amendment with fertilizer value, assuming that the metallic content of the media does not exceed State mandated limits. For example, if only Nitrate and Phosphate agricultural runoff is captured in the CAAB Media, the used CAAB may be suitable for use as a soil amendment.

VI. USE OF EXAMPLE CAAB COMPOSITIONS OF THE PRESENT INVENTION

When used as a water treatment media or material, the CAAB compositions of the present invention are typically contained such that water is exposed to the CAAB composition for a sufficient length of time to adsorb or remove contaminates as desired. The CAAB compositions of the present invention are thus typically used as part of a larger water treatment system that is designed to treat one or more particular problematic contaminants that may occur individually or more typically as a contaminant cocktail. Examples of water treatment systems for exposing CAAB compositions of the present invention are disclosed, for example, in the Applicant's U.S. patent application Ser. No. 16/291,906 entitled "Devices, Systems, and Methods for Removing Contaminates from Water.

Examples of containers appropriate for containing CAAB compositions of the present invention include bags, totes, barrels, wattles, curtains, weirs, and floating booms. The CAAB compositions of the present invention may also be placed, arranged, or otherwise inserted, in a container or in loose form, into vaults, cisterns, fixed water treatment structures above and below ground, bioswales ditches, or rain gardens also known as Low Impact Development Projects (LID), mobile treatment units. In either loose or contained form, the CAAB compositions of the present invention may be have application on farms, in ditches, or on streets as surrounds for drainage or discharge shoots. The sizes of the wattles, bags, booms and all form of containment, can be adjusted and customized for existing treatment areas. While containers yield significant flexibility when treating influent water from a wide variety of sources, a specific water treatment systems or method for treating a particular influent water source may be created for specific and sites.

VII. SUMMARY OF POTENTIAL BENEFITS

This invention is about a product produced under specific parameters using uniformly consistent and characterized feedstock. It is produced with far fewer steps than activated carbon. It is far less environmental destructive as it requires no mining of feedstock, and it possess faster kinetics or removal reactions than activated carbon. It has an amorphous shape and has pores of many sizes, but optimally has many of the micropore size, like activated carbon. With the pores comes a very large surface area, which intersects with that of Activated Carbon but exceeds that of all known commercial biochar materials. The advantages of disparate pore sizes, and fast kinetics, means smaller treatment beds are required. It also means that contaminants like e coliform, *Enterococcus* can be arrested in water or soil solutions, without negative pesticidal controls, and much more feasibly than any attempt at that by activated carbon. Biochar is made to give off energy, typically for heat or energy production. Activated carbon is typically used to retain that energy and so in that way the products are polar opposites. The overlap in the definition by element C, surface area definitions, porosity, and differ substantially in efficacy of reduction of microbes, water holding capacity, nutrient holding capacity, soil remediation and in the ability to reduce or eliminate chemical and biological oxygen demands in water or water systems. Moreover, wood-based charcoal is made more similarly to activated carbon. It is wood based, but the wood is fragmented into tiny particles where the chief intention was to pack, not expend energy in the heating process, so it would be a long burning fuel for barbecue. Charcoal and Activated Carbon are not suitable for use in agricultural soils. Typically they are ground or pulverized particles that are pelletized with binders that are necessary for energy packing and reducing any chance of oxidation, but that means they are not meant for gardening, and environmental uses A;C is typically slower in the uptake of environmental contaminants, though the number of sites for adhesion or bonding are greater than those in the CAAB range. The CAAB is fast and has multi-size pores that can remove bacteria such as *E. coli* and can remove COD much more effectively. In this invention, the CAAB substance is prepared by a technique of modified gasification. In contrast, conventional activated carbon and charcoal are more frequently made in a differing process called pyrolysis.

The present invention relates to systems, methods and to produce at scale highly reactive, catalytically-active, activated biocarbon compositions. In particular, the present invention relates to a class of products that are fixed, stable organic carbon-based substances with high porosity, low density, and high strength, and that are produced differently and react differently than commercial activated carbon and/or commercial biochar typically utilized for remediation. The invention thus falls between and apart from classes of prior carbon art such activated carbon and biochar.

In particular, the CAAB products of the present invention are catalytically active activated biochar compositions that may be designed for multi-types of sites and for numerous contaminants in need of removal, partitioning, or made bio-unavailable. The CAAB products of the present invention thus reduce or eliminate degradation of waters, surface and ground, soils, sediments, and the interface of water and soil, sediment, other solid and fluid areas impacted and also from industrial gases, such as that produced by coal energy production.

CAAB compositions of the present invention may also be used as a soil amendment to facilitate rehabilitation of lands negatively impacted, or rendered unusable due to chemical use in agriculture, or mining activities, buried gasoline or oil containers, or even soil removal in areas of development. Or areas overtaken by tainted flood waters, or wind erosion, weaken soil structure such mud slides, or as landfills ill-prepared or overwhelmed for the receipt of toxics and oxiding trash, and having to manage methane emissions, intrusions of saltwater into wells, as well as salt deposits left from agricultural fertilization practices. as examples.

CAAB compositions of the present invention may be configured to optimize the qualities of the solid carbon product such that it has greater porosity, surface area, adsorption capacity, and kinetics when compared to conventional biochars made either in by pyrolysis or gasification. The CAAB compositions of the present invention can thus be substituted or preferentially utilized in areas of environmental remediation where only activated carbons, ionic resins or expensive infrastructure could be in the past be used, and each with their limitations of targeted pollutants, site feasibility, and cost. The CAAB of the present invention may thus be deployed in any terrain, and target with the CAAB or one of more modified CAAB medias restrict, reduce, remove or inactivate a large number of contaminants simultaneously.

What is claimed is:

1. A method of producing remediation media comprising the steps of:

providing biomass chips of a predetermined size and moisture content;

storing a nitrogen compound;

introducing the biomass chips, air, and heat into an updraft gasifier system, wherein the heat is introduced from a lower portion of the updraft gasifier system;

injecting the nitrogen compound into the updraft gasifier system;

operating the updraft gasifier system for a predetermined time and at a predetermined temperature such that the biomass chips are suspended and mix with the injected nitrogen to obtain raw remediation media having catalytic activity.

2. A method as recited in claim 1, further comprising the step of separating the raw remediation media to obtain refined remediation media.

3. A method as recited in claim 2, further comprising the step of processing the refined remediation media to obtain enhanced remediation media.

4. A method as recited in claim 1, further comprising the step of processing raw biomass material to obtain the biomass chips.

5. A method as recited in claim 1, in which the biomass chips have a moisture content of within a range of 30% to 50%.

6. A method as recited in claim 1, in which the biomass chips have an average volume of 0.016" $in^3$ to 6.0 $in^3$.

7. A method as recited in claim 1, in which the biomass chips have a specific density of 0.05 to 0.7.

8. A method as recited in claim 1, in which the biomass chips have:

a moisture content of within a range of 30% to 50%;

an average volume of 0.016" $in^3$ to 6.0 $in^3$; and a specific density of 0.05 to 0.7.

* * * * *